United States Patent
Wylie et al.

(10) Patent No.: US 10,667,227 B2
(45) Date of Patent: May 26, 2020

(54) ELECTRONICALLY CONNECTED ENVIRONMENT

(71) Applicant: Mobile Tech, Inc., Lake Oswego, OR (US)

(72) Inventors: Hunter Wylie, Sherwood, OR (US); Robert Logan Blaser, Farmington, UT (US)

(73) Assignee: MOBILE TECH, INC., Lake Oswego, OR (US)

( * ) Notice: Subject to any disclaimer, the term of this patent is extended or adjusted under 35 U.S.C. 154(b) by 0 days.

(21) Appl. No.: 16/710,259

(22) Filed: Dec. 11, 2019

(65) Prior Publication Data

US 2020/0112935 A1 Apr. 9, 2020

Related U.S. Application Data

(63) Continuation of application No. 15/367,028, filed on Dec. 1, 2016, now Pat. No. 10,517,056.

(Continued)

(51) Int. Cl.
*G06Q 30/02* (2012.01)
*H04W 56/00* (2009.01)
(Continued)

(52) U.S. Cl.
CPC ...... *H04W 56/0025* (2013.01); *G06Q 10/087* (2013.01); *H04L 67/04* (2013.01); *H04L 67/12* (2013.01); *H04L 67/303* (2013.01); *H04L 67/42* (2013.01); *H04W 4/026* (2013.01); *H04W 84/18* (2013.01)

(58) Field of Classification Search
CPC .......... G06F 17/60; G06F 21/00; G06F 21/30; G06F 21/45; G06K 5/00; G06K 15/00; G06Q 10/00; G06Q 30/02; G06Q 40/02; H04L 9/00; H04L 29/06; H04L 29/08; H04L 63/08; H04L 63/105; H04L 67/303; H04W 4/02; H04W 4/026; H04W 12/06;
(Continued)

(56) References Cited

U.S. PATENT DOCUMENTS

| 883,335 A | 3/1908 | O'Connor |
| 3,444,547 A | 5/1969 | Surek |

(Continued)

FOREIGN PATENT DOCUMENTS

| AT | 506665 A1 | 10/2009 |
| CA | 2465692 A1 | 11/2004 |

(Continued)

OTHER PUBLICATIONS

U.S. Appl. No. 15/659,556: Application as filed Jul. 25, 2017, 62 pages.

(Continued)

*Primary Examiner* — Shawkat M Ali
(74) *Attorney, Agent, or Firm* — Thompson Coburn LLP

(57) ABSTRACT

Briefly, example methods, apparatuses, and/or articles of manufacture are disclosed that may be implemented, in whole or in part, to facilitate and/or support one or more operations and/or techniques for an electronically connected environment, such as implemented in connection with one or more computing and/or communication networks, devices, and/or protocols, for example.

27 Claims, 7 Drawing Sheets

Related U.S. Application Data

(60) Provisional application No. 62/262,843, filed on Dec. 3, 2015.

(51) Int. Cl.
*H04L 29/08* (2006.01)
*H04W 4/02* (2018.01)
*G06Q 10/08* (2012.01)
*H04L 29/06* (2006.01)
*H04W 84/18* (2009.01)

(58) Field of Classification Search
CPC .. H04W 12/08; H04W 56/00; H04W 56/0025
USPC ......... 325/380, 383; 375/220; 705/1, 10, 26, 705/39; 726/2, 6
See application file for complete search history.

(56) References Cited

U.S. PATENT DOCUMENTS

| | | |
|---|---|---|
| 3,612,462 A | 10/1971 | Mooney et al. |
| 3,780,909 A | 12/1973 | Callahan et al. |
| D244,857 S | 6/1977 | Hayes |
| 4,075,878 A | 2/1978 | Best |
| 4,117,465 A | 9/1978 | Timblin |
| 4,335,931 A | 6/1982 | Kinnear |
| 4,354,613 A | 10/1982 | Desai et al. |
| 4,384,688 A | 5/1983 | Smith |
| 4,590,337 A | 5/1986 | Engelmore |
| 4,714,184 A | 12/1987 | Young et al. |
| 4,772,878 A | 9/1988 | Kane |
| 4,898,493 A | 2/1990 | Blankenburg |
| 5,033,709 A | 7/1991 | Yuen |
| 5,072,213 A | 12/1991 | Close |
| 5,146,205 A | 9/1992 | Keifer et al. |
| 5,176,465 A | 1/1993 | Holsted |
| 5,187,744 A | 2/1993 | Richter |
| 5,230,016 A | 7/1993 | Yasuda |
| 5,246,183 A | 9/1993 | Leyden |
| 5,436,792 A | 7/1995 | Leman et al. |
| 5,457,745 A | 10/1995 | Wang |
| 5,459,637 A | 10/1995 | Ma et al. |
| 5,517,434 A | 5/1996 | Hanson et al. |
| 5,543,782 A | 8/1996 | Rothbaum et al. |
| 5,570,267 A | 10/1996 | Ma |
| 5,586,002 A | 12/1996 | Notarianni |
| 5,615,258 A | 3/1997 | Ho |
| 5,685,436 A | 11/1997 | Davet |
| 5,751,548 A | 5/1998 | Hall et al. |
| 5,847,924 A | 12/1998 | Youn |
| 5,861,807 A | 1/1999 | Leyden et al. |
| D409,018 S | 5/1999 | Deuschle |
| 5,903,645 A | 5/1999 | Tsay |
| 5,923,528 A | 7/1999 | Lee |
| 5,982,855 A | 11/1999 | Miyamoto |
| 6,039,496 A | 3/2000 | Bishop |
| D433,953 S | 11/2000 | Woznicki et al. |
| 6,170,775 B1 | 1/2001 | Kovacik et al. |
| 6,236,435 B1 | 5/2001 | Gertz |
| D455,166 S | 4/2002 | Raad et al. |
| 6,380,855 B1 | 4/2002 | Ott |
| 6,386,906 B1 | 5/2002 | Burke |
| 6,400,560 B1 | 6/2002 | Chian |
| 6,476,717 B1 | 11/2002 | Gross et al. |
| 6,491,276 B1 | 12/2002 | Belliveau |
| 6,502,727 B1 | 1/2003 | Decoteau |
| 6,504,710 B2 | 1/2003 | Sutton et al. |
| 6,549,130 B1 | 4/2003 | Joao |
| 6,581,421 B2 | 6/2003 | Chmela et al. |
| 6,659,382 B2 | 12/2003 | Ryczek |
| 6,702,604 B1 | 3/2004 | Moscovitch |
| 6,714,983 B1 | 3/2004 | Koenck et al. |
| 6,731,212 B2 | 5/2004 | Hirose et al. |
| 6,748,707 B1 | 6/2004 | Buchalter et al. |
| 6,761,579 B2 | 7/2004 | Fort et al. |
| 6,773,172 B1 | 8/2004 | Johnson et al. |
| 6,781,825 B2 | 8/2004 | Shih et al. |
| 6,786,766 B1 | 9/2004 | Chopra |
| 6,799,994 B2 | 10/2004 | Burke |
| 6,831,560 B2 | 12/2004 | Gresset |
| 6,856,506 B2 | 2/2005 | Doherty et al. |
| 6,885,817 B2 | 4/2005 | Artonne et al. |
| 6,896,543 B2 | 5/2005 | Fort et al. |
| D508,916 S | 8/2005 | Lee |
| 6,935,883 B2 | 8/2005 | Oddsen, Jr. |
| 6,944,294 B2 | 9/2005 | Tsay |
| 6,946,961 B2 | 9/2005 | Frederiksen et al. |
| 6,952,343 B2 | 10/2005 | Sato |
| 6,961,401 B1 | 11/2005 | Nally et al. |
| 7,002,467 B2 | 2/2006 | Deconinck et al. |
| 7,015,596 B2 | 3/2006 | Pail |
| 7,032,872 B2 | 4/2006 | Sullivan |
| 7,052,296 B2 | 5/2006 | Yang et al. |
| 7,053,774 B2 | 5/2006 | Sedon et al. |
| 7,068,496 B2 | 6/2006 | Wong et al. |
| 7,081,822 B2 | 7/2006 | Leyden et al. |
| 7,085,491 B2 | 8/2006 | Chiang |
| 7,101,187 B1 | 9/2006 | Deconinck et al. |
| 7,135,972 B2 | 11/2006 | Bonato |
| 7,154,039 B1 | 12/2006 | Marszalek et al. |
| 7,209,038 B1 | 4/2007 | Deconinck et al. |
| D545,826 S | 7/2007 | Richter |
| 7,287,652 B2 | 10/2007 | Scholen et al. |
| D563,444 S | 3/2008 | Brickzin |
| 7,352,567 B2 | 4/2008 | Hotelling et al. |
| 7,385,522 B2 | 6/2008 | Belden, Jr. et al. |
| 7,387,003 B2 | 6/2008 | Marszalek et al. |
| 7,446,659 B2 | 11/2008 | Marsilio et al. |
| 7,515,408 B2 | 4/2009 | Bakker et al. |
| 7,522,047 B2 | 4/2009 | Belden, Jr. et al. |
| 7,611,112 B2 | 11/2009 | Lin |
| 7,626,500 B2 | 12/2009 | Belden, Jr. et al. |
| 7,650,230 B1 | 1/2010 | Laverick et al. |
| 7,652,873 B2 | 1/2010 | Lee |
| 7,654,399 B2 | 2/2010 | Scholen et al. |
| 7,658,363 B2 | 2/2010 | Meyer |
| 7,667,601 B2 | 2/2010 | Rabinowitz et al. |
| 7,669,816 B2 | 3/2010 | Crain et al. |
| 7,684,185 B2 | 3/2010 | Farrugia |
| 7,688,205 B2 | 3/2010 | Ott |
| 7,696,857 B2 | 4/2010 | Kritt et al. |
| 7,710,266 B2 | 5/2010 | Belden, Jr. et al. |
| 7,712,661 B2 | 5/2010 | Thomas |
| 7,724,135 B2 | 5/2010 | Rapp et al. |
| 7,737,843 B2 | 6/2010 | Belden, Jr. et al. |
| 7,737,844 B2 | 6/2010 | Scott et al. |
| 7,737,845 B2 | 6/2010 | Fawcett et al. |
| 7,737,846 B2 | 6/2010 | Belden, Jr. et al. |
| 7,744,404 B1 | 6/2010 | Henson et al. |
| 7,848,833 B2 | 12/2010 | Li et al. |
| 7,866,623 B2 | 1/2011 | Lampman et al. |
| 7,883,279 B2 | 2/2011 | Kendall |
| 7,907,053 B2 | 3/2011 | Wildman et al. |
| 7,909,641 B1 | 3/2011 | Henson et al. |
| D635,555 S | 4/2011 | Giles |
| D636,778 S | 4/2011 | Corsini et al. |
| D640,247 S | 6/2011 | Baumann et al. |
| 7,969,305 B2 | 6/2011 | Belden, Jr. et al. |
| D641,756 S | 7/2011 | Hsieh et al. |
| 7,971,845 B2 | 7/2011 | Galant |
| D643,056 S | 8/2011 | Zaliauskas et al. |
| 8,009,348 B2 | 8/2011 | Zehner et al. |
| D645,047 S | 9/2011 | Wike |
| D649,076 S | 11/2011 | Alexander |
| 8,102,262 B2 | 1/2012 | Irmscher et al. |
| D661,646 S | 6/2012 | Son |
| 8,208,245 B2 | 6/2012 | Staats et al. |
| D663,972 S | 7/2012 | Alexander et al. |
| 8,251,325 B2 | 8/2012 | Molter |
| D668,660 S | 10/2012 | Norfolk |
| 8,282,060 B2 | 10/2012 | Fan |
| 8,289,131 B2 | 10/2012 | Cho et al. |
| D670,702 S | 11/2012 | Zhang et al. |
| D674,803 S | 1/2013 | Westrup |

(56) References Cited

U.S. PATENT DOCUMENTS

| | | |
|---|---|---|
| D678,293 S | 3/2013 | Meehan |
| D682,281 S | 5/2013 | Barnard et al. |
| 8,452,868 B2 | 5/2013 | Shafer et al. |
| 8,467,178 B2 | 6/2013 | Probst et al. |
| D687,440 S | 8/2013 | Shieh |
| 8,499,384 B2 | 8/2013 | Zerhusen |
| 8,531,829 B2 | 9/2013 | Oberpriller et al. |
| 8,558,688 B2 | 10/2013 | Henson et al. |
| 8,573,394 B2 | 11/2013 | Ahee et al. |
| D696,259 S | 12/2013 | Howarth et al. |
| 8,611,086 B1 | 12/2013 | Magnusson et al. |
| 8,698,617 B2 | 4/2014 | Henson et al. |
| 8,698,618 B2 | 4/2014 | Henson et al. |
| D704,194 S | 5/2014 | Young |
| 8,749,194 B1 | 6/2014 | Kelsch et al. |
| 8,749,963 B2 | 6/2014 | Staats et al. |
| 8,780,548 B2 | 7/2014 | Lee |
| 8,800,763 B2 | 8/2014 | Hale |
| 8,800,942 B2 | 8/2014 | Yu |
| 8,814,128 B2 | 8/2014 | Trinh et al. |
| 8,847,759 B2 | 9/2014 | Bisesti et al. |
| 8,851,565 B2 | 10/2014 | Hontz et al. |
| D717,804 S | 11/2014 | Budge |
| D718,316 S | 11/2014 | Veltz et al. |
| D719,144 S | 12/2014 | Eulette |
| 8,913,380 B2 | 12/2014 | Enomoto et al. |
| 8,955,807 B2 | 2/2015 | Alexander et al. |
| 8,963,498 B2 | 2/2015 | Ferguson |
| D725,119 S | 3/2015 | Gaylord |
| D726,732 S | 4/2015 | Lay et al. |
| 9,019,698 B2 | 4/2015 | Thiers |
| D732,037 S | 6/2015 | Wylie |
| 9,092,960 B2 | 7/2015 | Wheeler |
| 9,097,380 B2 | 8/2015 | Wheeler |
| 9,220,358 B2 | 12/2015 | Wheeler et al. |
| 9,229,494 B2 | 1/2016 | Rayner |
| D748,634 S | 2/2016 | Hofer et al. |
| 9,269,247 B2 | 2/2016 | Fawcett et al. |
| 9,303,809 B2 | 4/2016 | Reynolds et al. |
| D757,731 S | 5/2016 | Nguyen et al. |
| 9,373,236 B2 | 6/2016 | Oehl et al. |
| 9,396,631 B2 | 7/2016 | Fawcett et al. |
| D766,247 S | 9/2016 | Burmester |
| 9,478,110 B2 | 10/2016 | Fawcett et al. |
| 9,576,452 B2 | 2/2017 | Fawcett et al. |
| 9,641,539 B1 | 5/2017 | Votaw et al. |
| 9,659,472 B2 | 5/2017 | Fawcett et al. |
| D795,263 S | 8/2017 | Fujioka et al. |
| D798,302 S | 9/2017 | Burmester |
| 9,786,140 B2 | 10/2017 | Henson et al. |
| 9,847,806 B1 | 12/2017 | Dickie |
| 9,858,777 B2 | 1/2018 | Dandie et al. |
| 9,892,604 B2 | 2/2018 | Blaser et al. |
| 9,978,232 B2 | 5/2018 | Weusten et al. |
| 10,026,281 B2 | 7/2018 | Henson et al. |
| 10,251,144 B2 | 4/2019 | Blaser et al. |
| 2001/0049222 A1 | 12/2001 | Fort et al. |
| 2001/0055978 A1 | 12/2001 | Herrod et al. |
| 2002/0044406 A1 | 4/2002 | Shimoda et al. |
| 2002/0085343 A1 | 7/2002 | Wu et al. |
| 2002/0162366 A1 | 11/2002 | Chmela et al. |
| 2003/0007634 A1 | 1/2003 | Wang |
| 2003/0010859 A1 | 1/2003 | Ryczek |
| 2003/0128975 A1 | 7/2003 | Shevick |
| 2003/0137584 A1 | 7/2003 | Norvell et al. |
| 2003/0222149 A1 | 12/2003 | Solomon et al. |
| 2003/0222848 A1 | 12/2003 | Solomon et al. |
| 2003/0235029 A1 | 12/2003 | Doherty et al. |
| 2004/0003150 A1 | 1/2004 | Deguchi |
| 2004/0007721 A1 | 1/2004 | Forbes et al. |
| 2004/0017652 A1 | 1/2004 | Billington et al. |
| 2004/0077210 A1 | 4/2004 | Kollmann |
| 2004/0113819 A1 | 6/2004 | Gauthey et al. |
| 2004/0195192 A1 | 10/2004 | Belokin et al. |
| 2004/0201449 A1* | 10/2004 | Denison ............ G07C 9/00309 340/5.23 |
| 2004/0230725 A1 | 11/2004 | Chen et al. |
| 2004/0233631 A1 | 11/2004 | Lord |
| 2005/0040934 A1 | 2/2005 | Shanton |
| 2005/0047104 A1 | 3/2005 | Grunow et al. |
| 2005/0073413 A1 | 4/2005 | Sedon et al. |
| 2005/0088572 A1 | 4/2005 | Pandit et al. |
| 2005/0149723 A1 | 7/2005 | Watkins et al. |
| 2005/0165806 A1 | 7/2005 | Roatis et al. |
| 2005/0195783 A1 | 9/2005 | Basir |
| 2005/0206522 A1 | 9/2005 | Leyden et al. |
| 2005/0255895 A1 | 11/2005 | Lee et al. |
| 2006/0031477 A1 | 2/2006 | Ayyagari |
| 2006/0061958 A1 | 3/2006 | Solomon et al. |
| 2006/0067036 A1 | 3/2006 | Lin et al. |
| 2006/0148575 A1 | 7/2006 | Vitito |
| 2007/0030120 A1 | 2/2007 | Gusse et al. |
| 2007/0075914 A1 | 4/2007 | Bates |
| 2007/0145210 A1 | 6/2007 | Fawcett et al. |
| 2007/0152633 A1 | 7/2007 | Lee |
| 2007/0159328 A1 | 7/2007 | Belden et al. |
| 2007/0221726 A1* | 9/2007 | Thomas ............ G06Q 30/0185 235/383 |
| 2007/0229529 A1 | 10/2007 | Sekine et al. |
| 2007/0247793 A1 | 10/2007 | Carnevali |
| 2008/0104301 A1 | 5/2008 | Assouad et al. |
| 2008/0168806 A1 | 7/2008 | Belden et al. |
| 2008/0169923 A1 | 7/2008 | Belden et al. |
| 2008/0222849 A1 | 9/2008 | Lavoie |
| 2008/0288702 A1 | 11/2008 | Diab et al. |
| 2008/0300712 A1 | 12/2008 | Zachmann |
| 2009/0007390 A1 | 1/2009 | Tsang et al. |
| 2009/0033492 A1 | 2/2009 | Rapp et al. |
| 2009/0034221 A1 | 2/2009 | Kerrigan |
| 2009/0079566 A1 | 3/2009 | Goldstein et al. |
| 2009/0080684 A1 | 3/2009 | Groset et al. |
| 2009/0114556 A1 | 5/2009 | Tai et al. |
| 2009/0134997 A1 | 5/2009 | Godlewski |
| 2009/0166483 A1 | 7/2009 | Marsilio et al. |
| 2009/0173868 A1 | 7/2009 | Fawcett et al. |
| 2009/0179127 A1 | 7/2009 | Pettey |
| 2009/0183266 A1 | 7/2009 | Tan et al. |
| 2009/0225166 A1 | 9/2009 | Dronge |
| 2009/0303692 A1 | 12/2009 | Terlizzi |
| 2009/0328141 A1 | 12/2009 | Zhang et al. |
| 2010/0081337 A1 | 4/2010 | Dorogusker et al. |
| 2010/0097977 A1 | 4/2010 | Rommer et al. |
| 2010/0138581 A1 | 6/2010 | Bird et al. |
| 2010/0172081 A1 | 7/2010 | Tian et al. |
| 2010/0195279 A1 | 8/2010 | Michael |
| 2010/0215355 A1 | 8/2010 | Olien |
| 2010/0326934 A1 | 12/2010 | Goldberg |
| 2011/0047844 A1 | 3/2011 | Fawcett et al. |
| 2011/0068919 A1 | 3/2011 | Rapp et al. |
| 2011/0114804 A1 | 5/2011 | Liu et al. |
| 2011/0187531 A1 | 8/2011 | Oehl et al. |
| 2011/0195786 A1 | 8/2011 | Wells |
| 2011/0254661 A1 | 10/2011 | Fawcett et al. |
| 2011/0278885 A1 | 11/2011 | Procter et al. |
| 2011/0283754 A1 | 11/2011 | Ezzo et al. |
| 2011/0303816 A1 | 12/2011 | Horvath et al. |
| 2011/0309934 A1 | 12/2011 | Henson et al. |
| 2012/0026119 A1 | 2/2012 | Judy et al. |
| 2012/0033375 A1 | 2/2012 | Madonna et al. |
| 2012/0037783 A1 | 2/2012 | Alexander et al. |
| 2012/0043247 A1 | 2/2012 | Westrup |
| 2012/0043451 A1 | 2/2012 | Alexander et al. |
| 2012/0155004 A1 | 6/2012 | Yukawa et al. |
| 2012/0175474 A1 | 7/2012 | Barnard et al. |
| 2012/0182680 A1 | 7/2012 | Wetzel et al. |
| 2012/0188689 A1 | 7/2012 | Leung |
| 2012/0189156 A1 | 7/2012 | Leung |
| 2012/0193496 A1 | 8/2012 | Li |
| 2012/0205326 A1 | 8/2012 | Richter et al. |
| 2012/0217371 A1 | 8/2012 | Abdollahzadeh et al. |
| 2012/0280810 A1 | 11/2012 | Wheeler |
| 2012/0286118 A1 | 11/2012 | Richards |
| 2012/0293330 A1 | 11/2012 | Grant et al. |

(56) References Cited

U.S. PATENT DOCUMENTS

| | | |
|---|---|---|
| 2012/0293924 A1 | 11/2012 | Dolci et al. |
| 2012/0303476 A1 | 11/2012 | Krzyzanowski et al. |
| 2013/0026322 A1 | 1/2013 | Wheeler et al. |
| 2013/0026332 A1 | 1/2013 | Liu |
| 2013/0043369 A1 | 2/2013 | Wheeler |
| 2013/0058023 A1 | 3/2013 | Supran et al. |
| 2013/0161054 A1 | 6/2013 | Allison et al. |
| 2013/0168527 A1 | 7/2013 | Wheeler et al. |
| 2013/0238516 A1 | 9/2013 | Moock et al. |
| 2013/0268316 A1* | 10/2013 | Moock ............... G06Q 30/0201 705/7.29 |
| 2013/0346661 A1 | 12/2013 | Hasenei |
| 2014/0058023 A1 | 2/2014 | Wan et al. |
| 2014/0111337 A1 | 4/2014 | Taylor et al. |
| 2014/0118930 A1 | 5/2014 | Sedon |
| 2014/0159898 A1 | 6/2014 | Wheeler et al. |
| 2014/0168884 A1 | 6/2014 | Wylie |
| 2014/0321048 A1 | 10/2014 | Kupferstein |
| 2014/0351098 A1 | 11/2014 | Shafer et al. |
| 2014/0355200 A1 | 12/2014 | Thiers |
| 2014/0380442 A1 | 12/2014 | Addepalli et al. |
| 2015/0048625 A1 | 2/2015 | Weusten et al. |
| 2015/0156900 A1 | 6/2015 | Yeh et al. |
| 2015/0186685 A1 | 7/2015 | Vroom et al. |
| 2015/0201723 A1 | 7/2015 | Rayner et al. |
| 2015/0212590 A1 | 7/2015 | Feldstein et al. |
| 2015/0235533 A1 | 8/2015 | Grant et al. |
| 2015/0324742 A1 | 11/2015 | Herjolfsson et al. |
| 2015/0348381 A1 | 12/2015 | Fawcett et al. |
| 2016/0042620 A1 | 2/2016 | Dandie et al. |
| 2016/0054469 A1 | 2/2016 | Li |
| 2016/0055469 A1 | 2/2016 | Kim et al. |
| 2016/0055561 A1 | 2/2016 | Kim |
| 2016/0105359 A1* | 4/2016 | Kim ........................ H04L 43/08 370/252 |
| 2016/0112375 A1 | 4/2016 | Cohen et al. |
| 2016/0135560 A1 | 5/2016 | Yeh |
| 2016/0147390 A1* | 5/2016 | You ........................ H04W 4/70 715/740 |
| 2016/0239796 A1* | 8/2016 | Grant ..................... G06Q 30/06 |
| 2016/0307209 A1 | 10/2016 | Marszalek |
| 2016/0307415 A1 | 10/2016 | Marszalek et al. |
| 2016/0307416 A1 | 10/2016 | Marszalek et al. |
| 2016/0308952 A1 | 10/2016 | Marszalek et al. |
| 2016/0335859 A1 | 11/2016 | Sankey |
| 2017/0032636 A1 | 2/2017 | Henson et al. |
| 2017/0116832 A1 | 4/2017 | Weusten et al. |
| 2017/0164314 A1 | 6/2017 | Wylie et al. |
| 2017/0193780 A1 | 7/2017 | Moock et al. |
| 2017/0295953 A1 | 10/2017 | Sakata et al. |
| 2017/0300721 A1 | 10/2017 | Blaser et al. |
| 2018/0007648 A1 | 1/2018 | Wylie et al. |
| 2018/0035827 A1 | 2/2018 | Grant et al. |
| 2018/0049563 A1 | 2/2018 | Henson et al. |
| 2018/0107576 A1 | 4/2018 | Walden et al. |
| 2018/0288720 A1 | 10/2018 | Blaser |
| 2018/0288721 A1 | 10/2018 | Blaser |
| 2018/0288722 A1 | 10/2018 | Blaser |

FOREIGN PATENT DOCUMENTS

| | | |
|---|---|---|
| CA | 2802845 A1 | 3/2012 |
| CN | 103098104 A | 5/2013 |
| DE | 202009013722 U1 | 1/2011 |
| EP | 0745747 A1 | 12/1996 |
| EP | 1575249 A2 | 9/2005 |
| EP | 2619737 A1 | 7/2013 |
| ES | 1058183 U | 11/2004 |
| FR | 2595227 A1 | 9/1987 |
| FR | 2768906 A1 | 4/1999 |
| FR | 2868459 A1 | 10/2005 |
| GB | 2440600 A | 2/2008 |
| JP | H0573857 U | 10/1993 |
| JP | H0668913 A | 3/1994 |
| JP | 1997-259368 | 10/1997 |
| JP | 3100287 B2 | 10/2000 |
| JP | 2013529141 | 5/2011 |
| TW | 103115313 A | 11/2015 |
| WO | 1997031347 A1 | 8/1997 |
| WO | 2004038670 A1 | 5/2004 |
| WO | 2012039794 A1 | 3/2012 |
| WO | 2012069816 A1 | 5/2012 |
| WO | 2012151130 A2 | 11/2012 |
| WO | 2013015855 A2 | 1/2013 |
| WO | 2013068036 A1 | 5/2013 |
| WO | 2013134484 A1 | 9/2013 |
| WO | 2014019072 A1 | 2/2014 |
| WO | 2014107184 A1 | 7/2014 |
| WO | 2014134718 A1 | 9/2014 |
| WO | 2015050710 A2 | 4/2015 |
| WO | 2015051840 A1 | 4/2015 |
| WO | 2015169373 A1 | 11/2015 |
| WO | 2015184993 A1 | 12/2015 |
| WO | 2016130762 A1 | 8/2016 |
| WO | 2016179250 A3 | 12/2016 |

OTHER PUBLICATIONS

U.S. Appl. No. 15/659,556: Filing Receipt, Aug. 2, 2017, 3 pages.
PCT/PCT/US17/44230: Initial publication with ISR, Feb. 1, 2018, 46 pages.
PCT / PCT/US17/44230: Written Opinion of the International Search Authority, dated Feb. 1, 2018, 7 pages.
U.S. Appl. No. 15/600,642: Application as filed, May 19, 2017, 30 pages.
U.S. Appl. No. 15/600,642: Filing Receipt, May 31, 2017, 3 pages.
U.S. Appl. No. 29/415,938 and prosecution history, app filed Mar. 15, 2012.
16206866.2: app as filed Dec. 23, 2016.
U.S. Appl. No. 62/323,466: app as filed.
U.S. Appl. No. 62/323,511: app as filed Apr. 15, 2016.
U.S. Appl. No. 15/488,370: app as filed Apr. 14, 2017.
U.S. Appl. No. 15/488,379: app as filed Apr. 14, 2017.
PCT/US2017/027798: app as filed Apr. 14, 2017.
PCT/US2017/027801: app as filed Apr. 14, 2017.
U.S. Appl. No. 29/605,579: app as filed May 26, 2017.
U.S. Appl. No. 15/488,373: app as filed Apr. 14, 2017.
U.S. Appl. No. 15/488,383: app as filed Apr. 14, 2017.
U.S. Appl. No. 29/605,580: app as filed May 26, 2017.
U.S. Appl. No. 29/605,581: app as filed May 26, 2017.
U.S. Appl. No. 29/605,791: app as filed May 30, 2017.
U.S. Appl. No. 29/605,793: app as filed May 30, 2017.
U.S. Appl. No. 29/605,583: app as filed May 26, 2017.
U.S. Appl. No. 12/351,837: app as filed Jan. 10, 2009.
Excerpt from Bruce Schneier, Applied Cryptology: Protocols, Algorithms, and Source Code in C, 1994, 14 pages.
International Search Report for PCT/US2011/037235 dated Oct. 21, 2011.
International Search Report for PCT/US2016/064863 dated Oct. 10, 2017.
International Search Report for PCT/US2019/24956 dated Jun. 28, 2019.
MTI 2008 PowerPoint, "Vanguard Program" (Exhibit 1005 of Declaration of Mike Cook), pp. 1-9.
Office Action for U.S. Appl. No. 15/656,520 dated Mar. 28, 2019.
Office Action for U.S. Appl. No. 16/001,601 dated Sep. 12, 2018.
Office Action for U.S. Appl. No. 16/001,631 dated Jun. 17, 2019.
Office Action for U.S. Appl. No. 16/001,631 dated Sep. 14, 2018.
Office Action for U.S. Appl. No. 16/371,716 dated Apr. 26, 2019.
Office Action for U.S. Appl. No. 16/001,605 dated Jun. 3, 2019.
Propelinteractive, "Freedom Universal 2 Animation_003.wmv", YouTube Video <https://www.youtube.com/watch?v=_odGNnQvOBQ &t=1s, published on Feb. 16, 2010 (see sample screenshots, pp. 1-24).
Propelinteractive, "Installing LP3 Old Version", YouTube Video <https://www.youtube.com/watch? v=FRUa0FWiDRw&t=1s,> published on Jun. 28, 2010 (see sample screenshots, pp. 1-9).

(56) References Cited

OTHER PUBLICATIONS

Propelinteractive, "MTI LP3 Product Mounting", YouTube Video <https://www.youtube.com/watch?v=KX4TEuNCI,> published on Jun. 23, 2010 (see sample screenshots, pp. 1-11).
Prosecution History for U.S. Appl. No. 15/656,520, filed Jul. 21, 2017.
Prosecution History for U.S. Appl. No. 14/845,146, filed Sep. 3, 2015.
Prosecution History for U.S. Appl. No. 16/001,601, now U.S. Pat. No. 10,251,144, filed Jun. 6, 2018.
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.
RetailGeek, "Virtual Tour of MTI Retail Innovation Center in 2009," YouTube Video <https://www.youtube.com/watch?v=wUvcDAmhjO,> published on Aug. 2, 2010 (see transcript and sample screenshots, pp. 1-20).
Reuters, "MTI Begins Shipping Freedom TM Universal 2.0 Merchandising Solution", Oct. 1, 2008, pp. 1-3.
U.S. Appl. No. 61/607,802, filed Mar. 7, 2012.
U.S. Appl. No. 61/620,621, filed Apr. 5, 2012.
U.S. Appl. No. 61/774,870, filed Mar. 8, 2013.
U.S. Appl. No. 61/884,098, filed Sep. 29, 2013.
Unicam Europe, "Freedom Lp3 4.17.09", SlideShare Presentation <https://www.slideshare.net/Borfu/freedom-Ip3-41709,> published on Jul. 28, 2009 (pp. 1-9).
"35 mm Camera Display", Walmart Publication, 1995, 5 pages.
"Declaration of Mike Cook", *Vanguard Products Group, Inc.* v. *Merchandising Technologies, Inc.*, Case No. 3:10-cv-392-BR, U.S. District Court for the District of Oregon, Oct. 20, 2010, pp. 1-7.
"Declaration of Thaine Allison in Support of Patent Owner's Reply to Petitioner's Opposition to Patent Owner's Motion to Amend", Inter Partes Review of U.S. Pat. No. 7,909,641, Case IPR2013-00122, Feb. 5, 2014, pp. 1-13.
"Deposition of Thaine Allison, III", Inter Partes Review of U.S. Pat. No. 7,909,641, Case IPR2013-00122, Feb. 24, 2014, pp. 1-198.
"MTI Freedom Universal 2.0 Product Manual", Dec. 2008, pp. 1-21.
'Reasons for Substantial New Question of Patentability and Supplemental Examination Certificate', Inter Partes Review of U.S. Pat. No. 7,909,641, Case IPR2013-00122, Jan. 30, 2013, pp. 1-12.
U.S Appl. No. 14/845,146 and prosecution history, app filed Sep. 3, 2015.
U.S. Appl. No. 29/604,812: Application as filed May 19, 2017, 29 pages.
U.S. Appl. No. 29/604,812: Filing Receipt, May 23, 2017, 3 pages.
U.S. Appl. No. 29/604,812: Filing Receipt, Nov. 27, 2017, 3 pages.
U.S. Appl. No. 29/604,812: Requirement for Restriction/Election, dated Mar. 19, 2018, 7 pages.
PCT / PCT/US16/64863 / W02017/096330. Initial Publication without ISR, Jun. 8, 2017.
U.S. Appl. No. 15/656,520: Applicant Response to Pre-Exam Formalities, Sep. 25, 2017, 9 pages.
U.S. Appl. No. 15/656,520: Filing Receipt, Jul. 28, 2017, 3 pages.
U.S. Appl. No. 15/656,520: Filing Receipt, Sep. 26, 2017, 3 pages.
U.S. Appl. No. 15/656,520: Non-Final Rejection, dated Nov. 27, 2017, 11 pages.
U.S. Appl. No. 15/656,520: Notice of Publication, Jan. 4, 2018, 1 page.
U.S. Appl. No. 15/656,520: Application as filed and Preliminary Amendment, dated Jul. 21, 2017.
PCT/US16/64863 / WO2017/096330: International Search Report, dated Oct. 20, 2017, 5 pages.
U.S. Appl. No. 14/097,171: Issue Notification, Aug. 23, 2017, 1 page.
U.S. Appl. No. 14/097,171: Amendment/Req. Reconsideration—After Non-Final Reject, dated Jul. 1, 2015, 7 pages.
U.S. Appl. No. 14/097,171: Applicant Response to Pre-Exam Formalities Notice, Feb. 24, 2014, 9 pages.
U.S. Appl. No. 14/097,171: Amendment/Req. Reconsideration-After Non-Final Reject, dated Aug. 17, 2016, 7 pages.
U.S. Appl. No. 14/097,171: Application as filed, Dec. 4, 2013, 23 pages.
U.S. Appl. No. 14/097,171: Filing Receipt, Mar. 11, 2014, 3 pages.
U.S. Appl. No. 14/097,171: Filing Receipt, Aug. 2, 2017, 3 pages.
U.S. Appl. No. 14/097,171: Filing Receipt, Dec. 23, 2013, 3 pages.
14,097,171: Final Rejection, dated Sep. 17, 2015, 9 pages.
14,097,171: Final Rejection, dated Nov. 10, 2016, 14 pages.
14,097,171: Issue Fee Payment, Aug. 2, 2017, 1 page.
14,097,171: Non-Final Rejection, dated Jan. 2, 2015, 6 pages.
14,097,171: Non-Final Rejection, dated Mar. 17, 2016, 10 pages.
14,097,171: Notice of Allowance and Fees Due, dated May 2, 2017, 11 pages.
14,097,171: Notice of Publication, Jun. 19, 2014, 1 page.
14,097,171: Notice to File Missing Parts, Dec. 23, 2013, 2 pages.
14,097,171: RCE and Amendments, Feb. 17, 2016, 11 pages.
270P002 / 14,097,171: RCE and Amendments, Apr. 10, 2017, 18 pages.
U.S. Appl. No. 15/667,436: Non-Final Rejection, dated Feb. 22, 2018, 9 pages.
U.S. Appl. No. 15/667,436: Notice of Publication, dated Jan. 18, 2018, 1 page.
U.S. Appl. No. 15/667,436: Applicant Response to Pre-Exam Formalities Notice, Oct. 5, 2017, 11 pages.
U.S. Appl. No. 15/667,436: Filing Receipt, Aug. 10, 2017, 3 pages.
U.S. Appl. No. 15/667,436: Application as filed Aug. 2, 2017, 25 pages.
U.S. Appl. No. 15/667,436: Notice to File Missing Parts, Aug. 10, 2017, 2 pages.
U.S. Appl. No. 15/875,957: Application as filed, Jan. 19, 2018, 30 pages.
U.S. Appl. 15/875,957: Filing Receipt, Feb. 15, 2018, 3 pages.
U.S. Appl. No. 15/875,957: Office of Petitions Decision, dated Feb. 21, 2018, 2 pages.
U.S. Appl. No. 15/875,990: Application as filed Jan. 19, 2018, 33 pages.
U.S. Appl. No. 15/875,990: Filing Receipt, Feb. 14, 2018, 3 pages.
U.S. Appl. No. 15/659,556: Non-Final Rejection, dated Jan. 24, 2018, 22 pages.
U.S. Appl. No. 15/659,556: Notice of Publication, Feb. 1, 2018, 1 page.
Prosecution History for U.S. Appl. No. 15/367,028, now U.S. Pat. No. 10,517,056, filed Dec. 1, 2016.
Prosecution History for U.S. Pat. No. 10,524,220, filed Apr. 1, 2019.
"Amendment and Response A" for U.S. Appl. No. 16/001,605, dated Dec. 3, 2019.
"Supplemental Amendment" for U.S. Appl. No. 16/001,605, dated Dec. 9, 2019.
"Amendment and Response A" for U.S. Appl. No. 16/001,631, dated Mar. 13, 2019.
Office Action for U.S. Appl. 16/001,631, dated Jun. 17, 2019.
"Amendment and Response B with Request for Continued Examination (RCE)" for U.S. Appl. No. 16/001,631, dated Dec. 9, 2019.

* cited by examiner

ELECTRONICALLY CONNECTED ENVIRONMENT

CROSS-REFERENCE AND PRIORITY CLAIM TO RELATED APPLICATIONS

The present application is a continuation of U.S. patent application Ser. No. 15/367,028, entitled "Electronically Connected Environment", filed on Dec. 1, 2016, now U.S. Pat. No. 10,517,056, which claims priority to U.S. Provisional patent application Ser. No. 62/262,843, entitled "Mesh Network For A Retail Display," filed on Dec. 3, 2015, which are assigned to the assignee hereof and the entire disclosures of each of which are expressly incorporated herein by reference.

BACKGROUND

1. Field

The present disclosure relates generally to electronic environments and, more particularly, to electronic communications, such as within electronic environments.

2. Information

Electronic environments continue to evolve. Electronic communications are becoming commonplace and had improved our organizational lives, ability to access information, knowledge sharing, or the like. Continued advancements in information technology, mobile applications, or the like help to contribute to a rapidly growing market for electronic devices, which may already be viewed as "extensions of the hand" altering the manner in which society communicates, does business, or creates value. For example, with the advent of electronic and/or mobile technologies, such as in the form of smart telephones, tablet personal computers (PCs), remote or wireless sensors, or the like barriers between a "virtual" and "physical" presence have begun to dissolve, and fast technological adaptation of electronic environments had become essential to strategic competence and advancement for many organizations. Yet, in many sectors, such as corporate, transportation, assisted living, or the like, technological arrangements, organizational architectures, etc. of associated operating environments are in a catch-up mode. For example, at times, there may be a disconnect between various aspects, such as operating platforms and/or processes within a particular operating environment, which may negatively affect overall performance, communication, etc., increase or introduce complexities, or the like. Greater flexibility and/or variety of approaches for communicatively interoperating various technologies and/or technological aspects, such as via one or more electronically connected environments, for example, may, therefore, be desirable.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
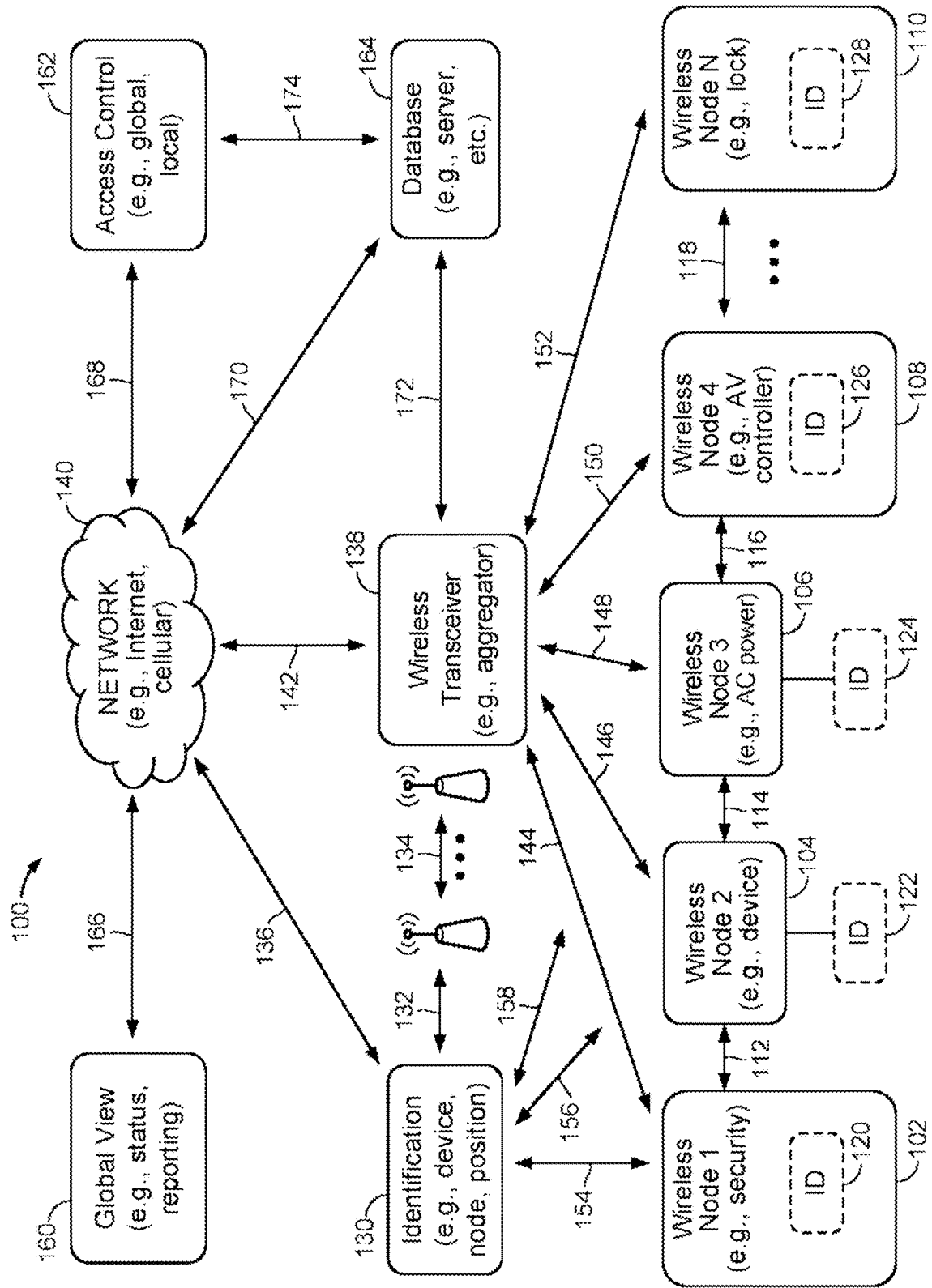
FIG. 1 is a schematic diagram illustrating features associated with an implementation of an example electronically connected environment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for an electronically connected environment, such as implemented in connection with one or more computing and/or communication networks, devices, and/or protocols discussed herein, for example. As alluded to previously, in some instances, an electronically connected environment may be implemented, at least in part, to communicatively interoperate a number of technological arrangements and/or aspects that may typically be employed as separate and/or independent solutions. For example, within a retail environment, such as a retail store, as one possible example, certain aspects, such as computing platforms, processes, etc. may comprise and/or be implemented as separate and/or independent solutions so as to address inventory maintenance, access control, power management, etc., managerial processes, such as staff training, loss prevention, day-to-day operation, etc., or the like. As another possible example, certain aspects, processes, etc. within an assisted living environment, such as, for example, to address regulatory compliance, treatment plans, prescription or like access control, progress reporting, security, etc. may be technically and/or communicatively "disjointed," such as implemented via separate and/or independent solutions.

By way of yet another example, in a consumer electronics sector, products like smart telephones, tablet personal computers, personal navigation devices, etc. may change quickly, with today's latest model becoming yesterday's model sold at a lower price. At times, to encourage sales, a retail store may, for example, employ a practice of product placement, also called "slotting," such as by displaying certain products in a preferred physical place or spot within a retail display, shelf, table, countertop, showroom, etc. A typical retail display, table, countertop, etc. thus may, for example, have a number of physical display or post positions, such as assigned and/or corresponding to particular products that are offered for sale. Particular examples of display positions will be discussed in greater detail below. Today, service providers, vendors, etc. selling products are willing to pay a premium for preferred product placement, in retail or otherwise. This has given rise to competition over specific display locations with service providers, vendors, etc. negotiating fee or other agreements to compensate entities, such as retailers, for example, for giving service providers, vendors, etc. a preferred location in a retail display, table, countertop, etc. over competitors. As such, with certain technology becoming outdated relatively quickly, such as consumer electronics mentioned above, as one possible example, yesterday's model is expected by service providers, vendors, etc. to be promptly moved by a retailer to a physical post position on a retail display that may be regarded as less prime, thus, leaving a more desirable position for a newer model.

Similarly, with retailers carrying a larger number of continually changing and/or rotating items, a service provider, vendor, etc. may expect these items to be timely restocked, such as for continual in-store presence and/or display in a preferred physical place, such as a display hook, shelf, etc., for example. As such, for vendors who pay a premium for preferred product placement, a retailer's continual rotation, restocking, etc. of a wide variety of products may, for example, create concerns, such as over whether the retailer is maintaining a sufficient inventory, placing a correct product in a correct spot, or the like. By way of yet another example, such as in the context of an assisted living environment, in order to obtain and/or maintain certification status, for example, regulatory compliance or other entities (e.g., insurance companies, etc.) may expect care providers to assess and/or report on staff training and/or delegation, treatment and/or service plans, medication access and/or administration processes, or the like. Likewise, here, for regulatory or other entities, such as those providing liability or like insurance for assisted living facilities, a number of insufficiencies, such as, for example, with respect to whether staff is properly trained, delegation is properly supervised, medication is properly stored, stocked, accessed, distributed, etc., or the like may create concerns.

In some instances, to address these or like issues, it may be useful, such as for vendors, retailers, care providers, insurers, or like entities of interest to ensure that, for example, products are properly stocked, displayed, rotated, etc., correct medicine is properly accessed, administered, etc., or the like. As was indicated, at times, however, various technologies and/or technological aspects, if at all, within these or like environments may be non-existent and/or relatively disjointed, such as in the form of communicative interoperability, for example, which may negatively affect overall performance, communication, etc., may increase or introduce complexities, affect revenue, etc., or the like. For example, at times, it may be rather difficult, such as costly, burdensome, inefficient, etc. to determine whether a number of particular products have been displayed at intended (e.g., preferred, etc.) locations and/or spots, whether a particular item has been sufficiently rotated and/or restocked, whether a particular medication has been properly accessed and/or administered, or the like. Accordingly, it may be desirable to develop one or more methods, systems, and/or apparatuses that may implement an electronically connected environment, such as to facilitate and/or support communicative interoperability of various technologies and/or technological aspects, arrangements, processes, etc., for example.

Thus, as will be described in greater detail below, an electronically connected environment may, for example, be implemented and/or used, at least in part, to facilitate and/or support electronic communications with one or more entities regarding one or more nodes on a network, such as to provide and/or improve interoperability of various associated technologies and/or technological aspects, arrangements, processes, or the like. At times, these or like electronic communications may, for example, occur through use of a digital identity of one or more nodes, which may be used, in whole or in part, to collect, use, communicate, etc. statistical environment-related information, audit a particular node and/or associated environment, implement access control, allow for off-site monitoring, or the like. Particular examples of nodes, entities, digital identities, electronic communications, etc. will also be described in greater detail below.

As will be seen, an electronically connected environment may, for example, be implemented in the context of any suitable operating environment, or a combination thereof, such as a retail environment, assisted living environment, health care environment, etc. To illustrate, in the context of a retail environment, as one possible example, an electronically connected environment may provide for a number of electronically addressable physical points or like elements, such as corresponding to a number of nodes positioned on a retail display, wall, shelf, store, etc. and capable of being controlled from a particular (e.g., central, etc.) interface, as one possible implementation. In some instances, nodes may, for example, be used, at least in part, to communicate environment-related information, such as report on a node status, system health, associated device operation, or the like, in real time or otherwise, as will also be seen. At times, environment-related information may include, for example, statistical information, such as a number of times an associated device, such as a smart telephone, for example, has been picked up or lifted by a customer from a display position, whether or not a device is charging, etc., whether a node is functioning, operational, etc., whether security alarms are functioning, whether a node is locked or unlocked, whether a correct device is at a correct display position, or the like. Again, claimed subject matter is not limited to a particular environment, environment-related information, etc.

In some instances, a node may, for example, be capable of functioning as a router or like device, where it may be able to identify signal traffic specific to the node, but may be a transparent pass-through node to unrelated signal traffic, such as signal traffic not be specific to the node, intended for a different node, device, entity, etc., just to illustrate one possible implementation. At times, a node may, for example, be capable of functioning as an access point or like device, which may be implemented, at least in part, via, for example, leveraging existing hardware and/or software (e.g., Bluetooth®, Wi-Fi, etc.) of an associated wireless device, if applicable, such as a smart telephone, though, again, claimed subject matter is not so limited. Thus, as also discussed below, in some instances, a node may comprise, for example, a wireless node having a wireless transmission and/or reception capability (e.g., via adequate circuitry, processing resources, etc.), such as for obtaining, collecting, processing, communicating, etc. environment-related information via properly routing signal traffic to other nodes, devices, entities, etc. and/or receiving signal traffic from other nodes, devices, entities, etc. (for implementing issued instructions or commands, etc.). For example, in some instances, a node may be capable of functioning as a repeater, such as to route wireless traffic so as to effectively extend the size and/or coverage of an associated network. At times, a node may, for example, be capable of functioning as a point providing a limited and/or unlimited access for one or more devices (e.g., cellular telephones, etc.) and/or nodes to one or more networks, such as a network associated with an electronically connected environment, the Internet, an intranet, or any other suitable network, or any combination of these or like networks. For example, at times, a wireless node may be capable of providing a limited and/or controlled access to the Internet, just to illustrate one possible implementation. In some instances, a wireless node may, for example, be capable of providing a limited and/or controlled access for one or more authenticated devices (e.g., customers' mobile devices, etc.) to a suitable database (e.g., associated with an electronically connected environment, etc.), such as for the purposes of accessing, communicating, etc. applicable information (e.g., via a push, pull, etc. signal transfer, etc.).

As also described below, nodes within an electronically connected environment may, for example, be implemented for a variety of uses and/or purposes. For example, in some instances, a node may comprise, for example, a lock node that may be set up at a position of an access door, cabinet, etc. to provide access, such as via locking and/or unlocking the door, cabinet, etc. in connection with appropriate authentication, authorization, or like processes. At times, a lock node may, for example, provide status information, such as whether a particular door, cabinet, etc. is currently locked or unlocked, etc., statistics, such as a number of times a particular door, cabinet, etc. has been locked and/or unlocked, etc., identifying information, such as who accessed a particular door, cabinet, etc., access time, etc., or the like. In some instances, a node may also be used, at least in part, to implement and/or improve communicative interoperability with respect to other areas of automation within an environment, such as, for example, alternating current (AC) or like power outlets, power strips, audio video (AV) controls, or the like.

At times, a node may comprise, for example, a camera node, such as implemented via an addressable camera or like imaging device communicatively interoperated with a particular node, device, entity, etc. within an electronically connected environment, thus, capable of providing imaging capability. In some instances, a camera node may, for example, allow for visual auditing of a particular environment to be performed, such as from an off-site and/or remote location, if desired. In some instances, a camera node may, for example, be implemented to monitor specific physical spaces, areas, etc. that may be occupied by products that may not be a "node." As a way of illustration, a camera node may, for example, image a good, such as a labeled bottle or some other product that is supposed to be at a specific spot within a retail shelf, display, wall, stand, etc., such as to confirm that a retailer is merchandizing the product correctly, restocking the product in a timely manner, or the like. At times, a node may, for example, comprise and/or be associated with a particular device (e.g., smart telephone, etc.), good, sensor, etc. and may facilitate and/or support node-related communications, such as in a similar fashion and/or as discussed herein.

In some instances, nodes within an electronically connected environment may not have a particular hierarchy, such as one node over another, for example, meaning that one or more individual nodes may be added and/or removed without impacting overall functioning of the environment, as will also be seen. As such, a node may, for example, be inserted into a particular environment as a programmable and/or configurable physical point or like element at different times, if desired, and may be used, at least in part, to electronically provide and/or implement computer-readable instructions (e.g., issued instructions or commands, etc.) and/or acquire suitable environment-related information. For example, nodes may be added to and/or subtracted from an electronically connected environment at suitable times, system or other updates may be periodically or suitably loaded to a programmable and/or configurable physical point or like element (e.g., automatically, etc.), such as to take into account one or more changing functions and/or new functions that may be added at one or more future points in time. Claimed subject matter is not so limited, of course. For example, at times, an electronically connected environment may, for example, be implemented via nodes comprising any suitable hierarchy, such as a tree-like hierarchy, as one possible example, meaning that one or more nodes may be lower in a hierarchy to comprise so-called "children" nodes, and one or more nodes may be higher in a hierarchy to comprise so-called "parent" nodes, just to illustrate another possible implementation. Again, any other suitable hierarchy and/or arrangement may be implemented herein, in whole or in part.

As will also be seen, at times, one or more communications of communicating electronically may, for example, be aggregated and/or channeled via a suitable computing device and/or platform, such as a wireless transceiver, just to illustrate one possible implementation, that may act as a center point of these or like electronic communications within a particular environment. A wireless transceiver may, for example, be capable of communicating with one or more nodes, devices, entities, etc., such as to allow for a global view, access control, and/or inquiry, among other aspects, into a number of retail environments comprising and/or associated with an electronically connected environment. In some instances, a wireless transceiver may, for example, be capable of communicating with one or more nodes, devices, entities, etc., such as to allow for a local view, access control, and/or inquiry into a particular retail environment comprising and/or associated with an electronically connected environment. At times, environment-related information may, for example, be obtained and/or stored, such as via one or more activity logs, for example, for the purposes of audits, loss prevention, training, reporting, or the like.

With this in mind, attention is drawn to FIG. 1, which is a schematic diagram illustrating features associated with an implementation of an example electronically connected environment 100 that may be utilized, in whole or in part, to address one or more issues discussed above, for example, or like issues. As described herein, environment 100 may be implemented via one or more special purpose computing apparatuses, information communication devices, information storage devices, computer-readable media, applications and/or instructions, various electrical and/or electronic circuitry, components, input and/or output signals, or the like. It should be appreciated that environment 100 is described herein as a non-limiting example that may be implemented, in whole or in part, in the context of one or more electronic communications networks or combination of such networks, such as public networks (e.g., the Internet, the World Wide Web), private networks (e.g., intranets), WWAN, wireless local area networks (WLAN, etc.), or the like. Claimed subject matter is not so limited, of course. For example, in some instances, one or more devices, entities, computing platforms, etc. may, for example, be capable of communicating with one or more other devices, entities, computing platforms, etc. directly, such as without an electronic communications network. It should also be noted that claimed subject matter is not limited to a particular environment shown. Thus, even though example electronically connected environment 100 is shown in the context of a retail consumer electronics environment, such as for ease of discussion, environment 100 may, for example, be implemented, in whole or in part, in the context of any other suitable environment or a combination thereof, such as transportation, assisted living, health care, etc. In addition, it should also be noted that claimed subject matter is not limited to communications, communications networks, etc. designated for indoor implementations, such as a retail store. For example, at times, one or more operations and/or techniques described herein may be performed, at least in part, in an outdoor environment, or any combination of an indoor and outdoor environment.

Thus, as illustrated, in an implementation, electronically connected environment 100 may comprise, for example, one or more wireless nodes, such as referenced generally as a Wireless Node 1 at 102, a Wireless Node 2 at 104, a Wireless Node 3 at 106, a Wireless Node 4 at 108, and so forth through a Wireless Node N, referenced at 110. In this context, "wireless node" refers to a computing platform and/or device capable of communicating electronically, such as transmitting and/or receiving signals via one or more wireless and/or wired communication protocols. As will be seen, depending on an implementation, a wireless node may comprise and/or be associated with a particular device, feature, fixture, good, service, etc., or any combination thereof, and, as such, may be referenced as, for example, a device node, a hook node, a shelf node, a display node, a power outlet node, an audio-video (AV) controller node, a camera node, a sensor node, a status indicator node, a docking station node, a goods node, a security node, or the like. Claimed subject matter is not so limited, of course. In general, it may be understood that a wireless node may be intended to be referenced in a particular discussion, although in the particular context, the term "node" may be employed for ease of discussion. Particular examples of wireless nodes and/or related communications will be discussed in greater detail below.

Figure 2:
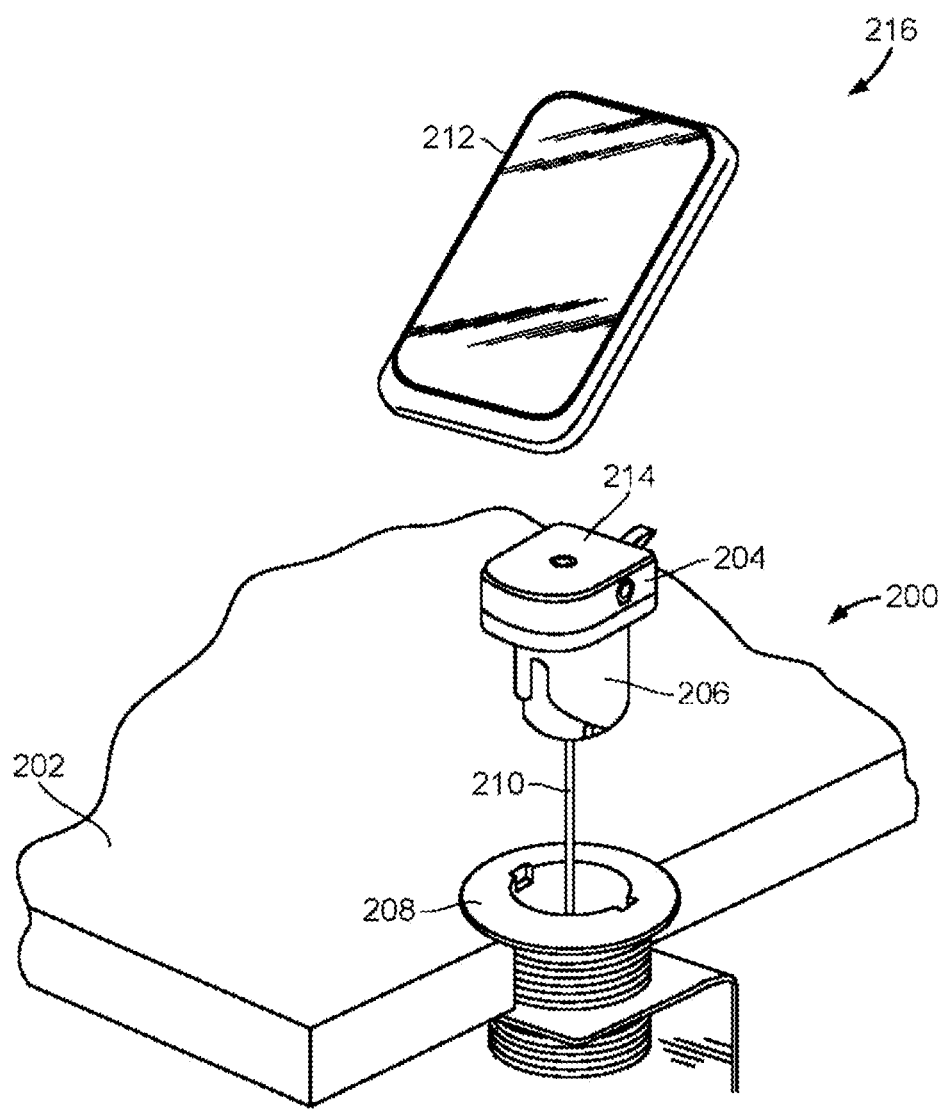
FIG. 2 is a schematic diagram illustrating an implementation of an example post position.

Thus, in at least one implementation, such as realized in the context of a consumer electronics environment, which may include a consumer electronics store, as one possible example, one or more wireless nodes may comprise and/or be associated with consumer electronic devices, such as, for example, cellular telephones, smart telephones, tablet PCs, wearable devices, or the like. As was also discussed, in some instances, to improve sales effectiveness, in-store consumer electronic devices may, for example, be slotted in a suitable manner, such as displayed in a preferred physical place or spot within a retail display, shelf, table top, wall, countertop, etc. For example, at times, in-store consumer electronic devices may be displayed via a number of post positions within a countertop, retail display, etc., though claimed subject matter is not so limited. As a way of illustration, one particular example of a post position that may be employed, at least in part, to display a consumer electronic device within a retail environment is illustrated in FIG. 2. As seen, a post position 200 may be slotted in a preferred physical place or spot, such as within a countertop 202, for example. At times, post position 200 may, for example, be slotted according to a so-called store "planogram" (POG), such as to ensure that a retailer is merchandizing products (e.g., electronic devices, etc.) correctly. Typically, a POG may comprise, for example, a diagram or like schematic illustrating and/or describing placement of particular products within a store, retail display, shelf, countertop, etc., or any combination thereof. As was indicated, a POG may, for example, be utilized, at least in part, to maximize products' selling potential, such as via increasing awareness for a brand, space value, etc., improving layout consistency, related product positioning, or the like. POGs are generally known and need not be described here in greater detail. As illustrated, in this example, post position 200 may comprise, for example, a mounting puck 204 that may be attached to a base 206 in a suitable manner, which, in turn, may be suitably attached to a countertop mount 208 and/or countertop 202 via a retractable security tether 210, as one possible example. As an example embodiment, this design can be used in a retail display for handhelds that has various addressable node points, all in communication with each other as part of a network, which may take the form of a mesh network. It should be appreciated that this design can be scaled to include multiple displays (multiple countertop displays, for example), all operating as part of the same network and controlled from a single place, if desired. Mounting puck 204 may, for example, serve as a mounting platform for any suitable consumer electronics device, illustrated herein as a smart telephone 212, as one possible example, such as via utilizing a mounting surface 214, though, again, claimed subject matter is not so limited. In an example embodiment, the mounting puck 204 houses an electronics control board or "ECB" that implements the node functionality. The ECB just described, at each position, can have a wireless communication capability that allows each display position to communicate with every other display position, or other type of node position, within the mesh network. Use of RFID is one mode of implementing wireless communication. Each node position can function as a form of router, where it is able to identify signal traffic unique or specific to the display position of the node; but be a transparent pass-through to unrelated signal traffic (i.e., signal traffic that is not specific to the node or intended for a different node or display position). In this instance, the ECB at the typical display position can be modified to provide the wireless transmission capability and have adequate electronic chip structure to maintain the information required for use at the display position or maintain the information required to properly route traffic to other display positions (nodes). As a node, each ECB can be used to collect various data at the post position, such as, for example, security sensor data, handheld identification data, or other sources of information like the number of times a handheld is lifted from the display post position. More kinds of information that would be specific to a retail display for a handheld involves status information like whether or not the device is charging; all parts are functioning; or security alarms are functioning. In this example, the mesh network, applied to a retail display of handhelds, can be used as a vehicle for determining handheld status and/or for data mining information that reveals many different types of useful information, including consumer preferences, in addition to basic information concerning whether things are operating properly or whether the correct device is at the correct position. Because individual handhelds are typically connected to the ECB in the mounting puck 204, it is possible to electronically determine, through the power adaptor cable, if the correct handheld is at the correct position on the display.

Referring back to FIG. 1, example electronically connected environment 100 may comprise, for example, any suitable number of wireless nodes, which may depend on an implementation, environment, wireless nodes, etc. In some instances, environment 100 may comprise the same or similar types of wireless nodes or, optionally or alternatively, may comprise different types of wireless nodes, or any combination thereof. Thus, as seen, at times, environment 100 may comprise, for example, a security node (e.g., wireless node 102), a device node (e.g., wireless node 104), a power outlet node (e.g., wireless node 106), an audio-video (AV) controller node (e.g., wireless node 108), a lock node (e.g., wireless node 110), and/or one or more other nodes not shown, such as a shelf node, a display node, a camera node, a sensor node, a status indicator node, a docking station node, a goods node, etc., if appropriate and/or applicable.

Briefly, for purposes of explanation which is not to be taken to limit claimed subject matter, a security node may comprise, for example, a wireless node comprising and/or associated with a security device, such as a consumer electronics (CE) security device or system, as one possible example. A security node may, for example, be employed, in whole or in part, to facilitate and/or support security of a device and/or node within its environment, obtaining and/or providing information from and/or to a device and/or node regarding its status, health, position (e.g., within a display, etc.), operation, identifying information, etc., whether power, applicable data, etc. are delivered to a device and/or node, or the like, or any combination thereof.

A power outlet node may comprise, for example, a wireless node that may be employed, in whole or in part, to facilitate and/or support any suitable power management platform and/or approach, such as via turning on and/or off power to one or more specific power outlets, providing security for devices requiring power and/or alarming in the event they are removed from a particular place, system, network, etc., obtaining position, identification, or like information on a device and/or node being powered, providing power to a device and/or node being powered, or the like, or any combination thereof.

An AV controller node may comprise, for example, a wireless node that may be employed, in whole or in part, to facilitate and/or support turning on and/or off audio, video or other AV-related signals, providing security for an AV system, obtaining position, identification, health, etc. information from one or more controlled devices and/or nodes, providing power to a controlled device and/or node, or the like, or any combination thereof.

A lock node may comprise, for example, a wireless node that may be employed, in whole or in part, to facilitate and/or support providing physical access, security, etc., such as in the form of a locking device (e.g., mechanical, electromechanical, etc.), as one possible example, to a good (e.g., medicine, etc.), locking and/or unlocking remotely, providing any suitable lock and/or node-related information (e.g., access times, status, identifications, names, alarms, etc.), or the like, or any combination thereof.

A shelf node may comprise, for example, a wireless node that may be employed, in whole or in part, to facilitate and/or support capturing any suitable information from products being displayed on a shelf or like structure (e.g., a stand, etc.). Information may include, for example, inventory-related, product-related, placement-related, etc. information. In some instances, a shelf node may be employed, at least in part, as a security device for products displayed on a shelf or like structure.

A display node may comprise, for example, a wireless node that may be employed, in whole or in part, to facilitate and/or support communicating, interacting, etc. with a particular display, such as an interactive display, as one possible example, determining position, health, or other aspects of a display, or the like, or any combination thereof. At times, a display node may act as a wireless transceiver, such as an access point, for example, facilitate and/or support display communications via an associated node, providing security to a display, etc. or any combination thereof.

A camera node may comprise, for example, a wireless node comprising and/or associated with a camera or like device with imaging capability. As will be seen, in some instances, a camera node may, for example, be employed, at least in part, to facilitate and/or support visual auditing of a retail store, display, etc., such as from an off-site location. At times, a camera node may, for example, be employed, at least in part, to facilitate and/or support monitoring specific physical spaces and/or areas, such as a shelves, display, stores, etc. occupied by one or more products that may not comprise a node. For example, in some instances, a camera node may image and/or monitor a labeled bottle (e.g., high-end wine, champagne, etc.) or other products (e.g., luxury perfume, etc.) that are supposed to be at a specific spot within a retail location, such as to confirm that a retailer is slotting the bottle or other product correctly.

A sensor node may comprise, for example, a wireless node that may be employed, in whole or in part, to facilitate and/or support providing and/or obtaining any suitable information from an associated environment, such as people counters, motion detectors, sound meters, data input and/or output, triggers (e.g., electromechanical, etc.), access detectors (e.g., door, access tags, etc.), or the like, or any combination thereof.

A status indicator node may comprise, for example, a wireless node that may be employed, in whole or in part, to facilitate and/or support a variety of notifications, such as notifying employees, customers, etc. that a particular event has occurred, as one possible example. A status indicator node may, for example, notify a store employee that a customer is in need of service, notify customers that they can be served at a counter, notify a customer, employee, etc. that a particular product is out of stock, or the like, or any combination thereof.

A docking station node may comprise, for example, a wireless node that may be employed, in whole or in part, to facilitate and/or support obtaining health, position, identifying, or other information with respect to a node and/or a device being docked, providing power to a node and/or device being docked, communication with one or more other nodes, devices, etc., or the like, or any combination thereof.

A goods node may comprise, for example, a wireless node comprising and/or associated with one or more goods, such as one or more products, commodities, materials, etc. that satisfies human wants, provides utility, or the like. A goods node may, for example, be employed, in whole or in part, to facilitate and/or support goods-related communication, assessing customer satisfaction to a need, assessing customer satisfaction to a service, providing training or other suitable goods-related information, or the like, or any combination thereof.

Again, these are merely examples relating to wireless nodes, and claimed subject matter is not limited in this regard. As seen and as referenced via communication links 112, 114, 116, and/or 118, in some instances, one or more wireless nodes 12, 104, 106, 108, and/or 110 may, for example, be capable of communicating with one or more other nodes, such as for the purpose of passing through, routing, obtaining, etc. information, as was indicated.

As also illustrated, in some instances, one or more wireless nodes may, for example, comprise and/or be associated with a node identification function and/or process, referenced generally herein as node identifiers or IDs via respective dashed boxes at 120, 122, 124, 126, and 128. As seen, at times, these node IDs may comprise a function and/or process dedicated to a particular wireless node, for example, but may or may not be part of a node (e.g., embedded within a node, etc.). Although not shown, it should also be noted that, in some instances, a particular wireless node may not comprise and/or be associated with a node ID, which may depend on a particular device, node, environment, implementation, etc. By way of example but not limitation, a wireless node that may not comprise and/or be associated with a node ID may include a router node acting as a pass-through point so as to extend a network size, an inventory node acting as a security point to detect and/or prevent products from leaving a location, a node dependent upon another node (e.g., in a master-slave configuration, etc.), or the like, or any combination thereof. As was indicated, a node ID may, for example, be capable of identifying a particular node, associated device, slotting position within a retail display, shelf, etc., locating a mobile node, device, etc. within a mobile environment, locating a new node entering into a network, or the like, or any combination thereof. For example, in some instances, a node identification function and/or process may make use, at least in part, of a node's digital identity. In this context, "digital identity" refers to one or more attributes related to and/or representative of a particular wireless node or a combination of nodes that a computing platform and/or device may use, in whole or in part, to electronically identify such a node or a combination of nodes. As used herein, "electronic," "electronically," or similar terms refer to an operation, process, etc. involving physical manipulation of physical quantities. Typically, such quantities may take the form of electrical digital and/or magnetic signals and/or states capable of being stored, transferred, combined, compared, communicated, processed or otherwise manipulated, such as via any suitable circuitry and/or processing resources.

A digital identity may, for example, be assigned to and/or associated with a wireless node, or a combination of nodes, via any suitable approach. For example, at times, a digital identity may be assigned to a particular electronic device (e.g., smart telephone 212 of FIG. 2, etc.) by a product manufacturer (e.g., Apple, Inc., etc.), service provider (e.g., Verizon® Wireless, etc.), global decimal administrator (GDA), etc., and/or may be associated with a corresponding wireless node (e.g., device node 216 of FIG. 2, etc.), such as by a system administrator, retailer, entity, etc. A digital identity may include any suitable letter, numeral, symbol, image, etc., or any combination thereof, and may comprise and/or be represented, at least in part, via a numeric, alphabetic, alphanumeric, symbolic, semiotic, etc. representation, such as a number, code, name, symbol, or the like. Thus, as a way of illustration, a digital identity may, for example, comprise and/or be represented, at least in part, via an International Mobile Subscriber Identity (IMSI), an Integrated Circuit Card Identity (ICCID), an International Mobile Equipment Identity (IMEI), a Mobile Station Integrated Services for Digital Network number (MSISDN), a model, a type, a make, a barcode, a universal product code (UPC), a serial number, software parameters, hardware parameters, a location, or the like, or any combination thereof.

In some instances, a digital identity may, for example, be assigned to and/or associated with a wireless node via one or more suitable wired and/or wireless communications between a particular electronic device and a suitable display post having a wireless and/or wired communication capability. To illustrate, using an example implementation of device node 216 of FIG. 2, smart telephone 212 may, for example, communicate a digital identity, which may comprise its assigned IMEI or like number, if applicable, to post position 200 via a USB, RFID, RF, or like protocol, such as upon being connected to post position 200 via a USB cord, via placing an applicable RFID reader within its field of operation, or the like. At times, a digital identity may, for example, be communicated via scanning an applicable barcode, user input, or the like. Of course, these are merely details to which claimed subject matter is not limited. Any other suitable techniques may be employed herein. As will be seen, a digital identity may, for example, be used, in whole or in part, for the purposes of identifying an associated wireless node in connection with one or more operations and/or techniques for an electronically connected environment.

As was indicated, in an implementation, a digital identity of a wireless node may be used, at least in part, to determine a location of the node within a particular environment, such as a slotting position within a retail display, retail store, shelf, wall, or the like. For example, a location of a wireless node may be determined, at least in part, via associating or linking its digital identity with a pre-defined or prescribed (via a POG, etc.) slotting position within a retail display, shelf, store, etc., though claimed subject matter is not so limited. A location of a wireless node may, for example, be determined, at least in part, in relation to a global coordinate system, local coordinate system, or any combination thereof. A global coordinate system may comprise, for example, a coordinate space mapped according to a global reference frame, such as Earth-centered coordinates (e.g., latitude, longitude, etc.). A local coordinate system may comprise, for example, a coordinate or other (e.g., logical, etc.) space not mapped according to a global reference frame. As such, a local coordinate system may comprise, for example, any suitable system capable of facilitating and/or supporting location determination with respect to a wireless node. For example, in some instances, a location of a wireless node may be determined, at least in part, with reference to a space mapped according to a store POG, such as a slotting position within a retail display, shelf, wall, etc. At times, a location of a wireless node may comprise a point or like element, such as in a physical and/or logical space, for example, determined via referencing some other point or like element (e.g., Node 2 is located immediately to the right of Node 1, etc.), device (e.g., iPhone® 7 is next to Samsung® Galaxy Note 7, etc.), slotting position (e.g., Node 3 is at display position 5, etc.), or the like. In some instances, a location of a wireless node may comprise, for example, a point or like element mapped to a floor plan of a retail store, just to illustrate another possible implementation. Of course, these are merely examples to which claimed subject matter is not limited.

Continuing with example electronically connected environment 100 of FIG. 1, in some instances, an identification function and/or process, such as discussed above, for example, may not be dedicated to a particular node, or a combination of nodes, but may comprise, for example, a separate or stand-alone identification entity, as referenced at 130. At times, identification entity 130 may, for example, be implemented via a function and/or process residing on a suitable computing platform and/or device, such as a tablet PC, command kiosk, or the like, as discussed below. Identification entity 130 may, for example, be capable of identifying one or more wireless nodes 102, 104, 106, 108, and/or 110, such as separately or in any suitable combination, one or more associated devices, slotting positions within a retail display, shelf, wall, store, etc., or any combination thereof, such as in a fashion similar to a dedicated identification function and/or process discussed above. As illustrated generally via communication links 132, 134, and 136, identification entity 130 may, for example, be capable of communicating with one or more applicable wireless nodes via a wireless transceiver 138 and/or communications network 140, discussed below. In turn, communications network 140 and/or wireless transceiver 138 may employ a number of communication links, referenced generally at 142, 144, 146, 148, 150, and 152, to facilitate and/or support communication with wireless nodes 102, 104, 106, 108, and/or 110, such as for the purposes of node identification or otherwise. In at least one implementation, identification entity 140 may, for example, be capable of communicating with one or more wireless nodes directly, as referenced generally via wireless communication links 154, 156, and/or 158. Particular examples regarding these or other communications related to example electronically connected environment 100 will be described in greater detail below.

As was indicated, in at least one implementation, environment 100 may comprise wireless transceiver 138 that may, for example, act as a center point of one or more electronic communications from and/or to wireless nodes 102, 104, 106, 108, and/or 110. For example, in some instances, wireless transceiver 138 may be implemented as a wireless local area network (WLAN) access point capable of facilitating and/or supporting access to communications network 140. In another example implementation, wireless transceiver 138 may comprise, for example, a cellular base station capable of communicating with one or more wireless nodes 102, 104, 106, 108, and/or 110 via an applicable cellular communication protocol. In yet another example implementation, wireless transceiver 138 may comprise, for example, a femtocell or picocell capable of communicating with one or more wireless nodes 102, 104, 106, 108, and/or 110 at a shorter range than at a range established via a base station transceiver, if applicable. Of course, it should be understood that these are merely examples of wireless transceivers, and claimed subject matter is not limited in this regard. As illustrated, in some instances, environment 100 may comprise a larger number of wireless transceivers, which may be capable of communicating electronically, as referenced via communication links 132 and 134, such as for any suitable purpose (e.g., signal traffic routing, information forwarding, communicating, etc.) to facilitate and/or support one or more operations and/or techniques associated with environment 100.

According to an implementation, wireless transceiver 138 may comprise, for example, an aggregator or like function and/or process, which may or may not comprise a separate or stand-alone computing platform and/or device. An aggregator may, for example, be capable of collecting, consolidating, buffering, caching, communicating, etc. any suitable information within example environment 100, such as prior to communicating this or like information to one or more nodes, entities, devices, etc. associated with example environment 100. Claimed subject matter is not so limited, of course. For example, at times, suitable information may be communicated to one or more nodes, entities, devices, etc. associated with example environment 100 without being collected, consolidated, buffered, cached, etc. In some instances, wireless transceiver 138 may, for example, act as a point of information integration (e.g., for a suitable database, etc.), such as if a network connectivity is lost, being built, repaired, etc.

Communications network 140 may comprise, for example, any suitable wireless and/or wired communication link and/or network, or a combination of wired and/or wireless communication links and/or networks. Thus, in at least one implementation, communications network 140 may comprise, for example, Internet Protocol (IP)-type infrastructure capable of facilitating and/or supporting one or more communications between a global view entity 160, an access control entity 162, a database 164, wireless transceiver 138, and/or identification entity 130, such as via respective communication links 166, 168, 170, 142, and 136. In certain implementations, communications network 140 may comprise, for example, cellular communication network infrastructure, such as a base station controller and/or master switching center capable of facilitating and/or supporting one or more cellular communications between global view entity 160, access control entity 162, database 164, wireless transceiver 138, and/or identification entity 130. In yet another implementation, communications network 140 may, for example, facilitate and/or support one or more communications between global view entity 160, access control entity 162, database 164, and/or identification entity 130 with wireless nodes 102, 104, 106, 108, and/or 110, such as without the use of wireless transceiver 138. Thus, to illustrate, depending on an implementation, communications network 140 may comprise, for example, a wireless local area network (WLAN, e.g., IEEE Std. 802.11 network, etc.), wireless personal area network (WPAN, e.g., Bluetooth® network, etc.), cellular communications network, Internet, one or more intranets, or any other suitable network or any combination thereof.

As was indicated, at times, example environment 100 may include database 164, which may comprise, for example, any suitable information repository capable of storing or otherwise retaining information, which, at times, may be in the form of binary digital signals, just to illustrate one possible implementation. For example, in some instances, database 164 may store binary digital signals comprising attributes related to one or more wireless nodes 102, 104, 106, 108, and/or 110, such as statistical attributes, identifying attributes, security attributes, operational attributes, or the like, or any combination thereof. Statistical attributes may comprise, for example, information regarding a number of time a particular electronic device (e.g., smart telephone 212 of FIG. 2, etc.) has been lifted or picked up by a customer, a duration of a particular lift, a number of nodes within environment 100, a number of alarm events (e.g., theft attempts, etc.), a number of times a particular node has been accessed (e.g., by store personnel, etc.), activated, (e.g., a lock node has been locked, unlocked, etc.), non-compliant (e.g., POG compliance, etc.), etc., information regarding a movement of a node within a network, whether a device associated with a node is on or off, or the like, or any combination thereof. Identifying attributes may comprise, for example, information regarding a device model, type, make, etc., wireless node address (e.g., local, global, etc.), node's digital identity, post or display position, power status, software version, manufacturer, or the like, or any combination thereof. Security attributes may comprise, for example, information regarding whether a node is currently armed or disarmed, a number of times a node has been armed and/or disarmed, whether a post position is alarming (e.g., a tether has been cut, theft attempted, etc.), whether alarms are functioning properly, a version of a security system (e.g., age, date of sale, type, etc.), or the like, or any combination thereof. Operational attributes may comprise, for example, information regarding whether a device is charging, whether an environment, or any part of thereof, is powered correctly, AV devices are imaging properly, whether operation-related data is being communicated appropriately, or the like, or any combination thereof.

Database 164 may, for example, store one or more node-related attributes in any suitable format, such as a table (e.g., relational, logical, etc.) matrix, index, cluster, etc., such as to facilitate and/or support timely accessing, processing, retrieving, presenting, communicating, etc. suitable information. Thus, in some instances, database 164 may comprise and/or be associated with one or more server devices, which may facilitate and/or support one or more operations and/or techniques associated with example environment 100. For example, an associated server device may facilitate and/or support providing any suitable notifications to one or more entities within environment 100, as discussed below, such as via a real time or near real time push-type and/or pull-type signal transfer. Briefly, in the context of the present disclosure, push and/or pull-type signal transfers comprise communications distinguished by which end of a communication path initiates signal transfer. Push and pull-type signal transfers are generally known and need not be described in greater detail. In this disclosure, "real time" refers to an amount of timeliness of information, which may have been delayed by, for example, an amount of time attributable to electronic communication and/or signal processing. At times, node-related attributes may be stored in database 164 with reference to a digital identity of a particular wireless node, such as to implement one or more applicable look up operations, for example. Database 164 may be accessible, such as by one or more appropriate entities associated with environment 100, for example, over communication network 140, such as utilizing communication link 170, and/or directly, such as utilizing a communication link 172 (e.g., for communications with wireless transceiver 138, etc.), a communication link 174 (e.g., for communications with access control entity 162, etc.), or any other suitable communication link or a combination of links, which may depend on a particular device, node, environment, implementation, entity, or the like. Although not shown, database 164 may, for example, be capable of communicating with wireless nodes 102, 104, 106, 108, and/or 110 directly, such as via receiving and/or transmitting one or more signals, wireless or otherwise, without the use of wireless transceiver 138. At times, database 164 may comprise, for example, a portion of clients' current IT infrastructure, such as to facilitate and/or support pushing and/or pulling information from a client database into environment 100 (e.g., on an as needed basis, etc.).

Continuing with the above discussion, example electronically connected environment 100 may comprise, for example, access control entity 162, which, in some instances, may be implemented via a function and/or process residing on a suitable computing platform and/or device, such as a tablet PC, command kiosk, smart telephone, server device, etc., just to illustrate a few possible implementations. As will be seen, access control entity 162 may be capable of authorizing, authenticating, approving, auditing, etc. electronic access with respect to one or more wireless nodes, entities, devices, functions, processes, etc. associated with environment 100. Access control entity 162 may, for example, be capable of communicating with one or more wireless nodes, entities, devices, etc. associated with environment 100 over communications network 140, such as via communication link 168, as one possible example, and/or directly via one or more applicable communication links (not shown). In at least one implementation, authorizing, authenticating, approving, auditing, etc. electronic access may, for example, be implemented, at least in part, via login permissions, which, at times, may be defined via roles and corresponding privileges, though claimed subject matter is not so limited. In some instances, access control entity 162 may comprise, for example, local access control and global access control aspects. Local access control may, for example, be applicable and/or implemented with respect to a particular retail environment, such as a particular retail store (e.g., Verizon® Wireless franchise store, AT&T® Authorized Dealer store, etc.). Global access control may, for example, be applicable and/or implemented with respect to a particular environmental domain, such as a particular organizational or business entity (e.g., Verizon® Communications, AT&T® Corporation, etc.).

In an implementation, local as well as global access control may, in turn, comprise, for example, a plurality of access control levels. For example, in some instances, local and global access control may respectively comprise an employee-type level, a manager-type level, and an administrator-type level of access control. An employee-type level for local access control may generally be applicable and/or implemented with respect to, for example, retail store employees, such as for the purpose of authorizing, authenticating, approving, etc. employee electronic access with respect to applicable activities within a particular store. To illustrate, an employee-type level for local access control may, for example, allow employees to arm and/or disarm one or more wireless nodes, retail displays, etc. from within a store, lock and/or unlock in-store cabinets, access applicable training materials for electronics, etc., access real-time store-related data, such as to confirm that one or more nodes are functioning properly, etc., etc., or any combination thereof.

A manager-type level for local access control may generally be applicable and/or implemented with respect to, for example, store or shift managers and may encompass an employee-type level of access, but, in addition, may also allow for arming and/or disarming a retail store (e.g., from the outside and/or inside, etc.), accessing a store POG (e.g., to verify compliance, etc.), creating a store node, moving display positions within a store, setting up and/or deleting employee permissions (e.g., access keys, access times, etc.), accessing audit information (e.g., employee access logs, training logs, etc.), ordering replacement parts, reporting (e.g., for POG compliance, parts usage, etc.), accessing real-time and/or historical store-related data (e.g., access, compliance, service, statistical, etc. data), etc., or any combination thereof.

An administrator-type level for local access control may generally be applicable and/or implemented with respect to, for example, system or like administrators (e.g., information technology (IT) administrators, etc.), such as for the purpose of providing maintenance, installation, troubleshooting, etc., adding, removing, updating employee and/or manager account information, managing access and/or permissions, etc., etc., or any combination thereof, with respect to a particular store. In some instances, an administrator-type level for local access control may, for example, be implemented, at least in part, via a master password, though claimed subject matter is not so limited. For example, at times, an administrator-type level for local access control may, for example, be implemented, at least in part, via individual administrator or like accounts.

Continuing with the above discussion, in an implementation, an employee-type level for global access control may generally be applicable and/or implemented with respect to, for example, corporate or like employees, such as for the purpose of authorizing, authenticating, approving, etc. employee electronic access with respect to one or more local operating environments, such as retail stores located within a particular geographic region, as one possible example. An employee-type level access may, for example, allow corporate or like employees to analyze statistics (e.g., a number of nodes that are operational, powered, secured, etc., which stores are routinely non-compliant, most and/or least popular, alarming, etc.), verify POG or like compliance, confirm product pricing, etc., obtain retail reports, access records (e.g., maintenance, purchase, etc.), add new locations (e.g., stores, environment, etc.), change regional or other database structure for reporting purposes, obtain information as it relates to a location type, access information tied to product performance (e.g., for a specific manufacturer, category of products, etc.) for marketing or like purposes, etc., or any combination thereof.

According to an implementation, a manager-type level for global access control may generally be applicable and/or implemented with respect to, for example, corporate or like managers (e.g., responsible for a number of geographic regions, etc.) and, likewise, may encompass a corporate employee-type level of access control, but, in addition, may also allow for POG changes, pushing content to stores in the form of POGs and/or POG changes, applicable training, etc, etc., or any combination thereof.

In an implementation, an administrator-type level for global access control may generally be applicable and/or implemented with respect to, for example, system or like administrators, similarly, for the purpose of providing maintenance, installation, troubleshooting, etc., adding, removing, updating corporate employee and/or manager account information, managing access and/or permissions, etc. add or augment any store information categories required to properly report on store performance, etc., or any combination thereof. In some instances, an administrator-type level for global access control may also allow for creating and/or activating a new operating environment, new business account, new retail store, etc. within an applicable system, pushing training content for store administrators, etc., etc., or any combination thereof.

At times, an administrator-type level for global access control may have all-inclusive system level access, such as on both store and corporate levels, for example, to comprise a master-administrator-type level. Thus, in some instances, a master-administrator may, for example, be able to set up and/or provide access to an electronically connected environment (e.g., environment 100, etc.), set up geography constraints, administrative privileges at a store and/or corporate level, etc., deactivate a customer account (e.g., for non-payment, etc.), tier a particular node functionality based on payment, set up a product and/or parts catalog specific to a store's purchasing history (e.g., for easier maintenance, stocking, etc.), add and/or augment any store information categories for reporting on store performance, etc., or any combination thereof. At times, a master-administrator for global access control may, for example, be granted privileges to analyze and/or create customizable reports regarding consumer behavior (e.g., at retail stores, etc.), such as for the purposes of data monetization. These or like reports may comprise, for example, a percentage of interactive "lifts" by customers or up-time for one or more applicable devices (e.g., Apple® iPhone 7, etc.) by store and/or geography, comparative data of lift activity with respect to different devices (e.g., Samsung® Galaxy Note 7 vs. Apple® iPhone 7, etc.) and/or different types of devices (e.g., smart telephone vs. smart watch, etc.), change in consumer behavior (e.g., from marketing campaigns, etc.), provide metrics and data to manufacturers as the invest in marking campaigns tied to a retailer, etc., or any combination thereof. Depending on an implementation, these or like administrator-type levels may, for example, be distinguished via password types (e.g., master vs. regular, etc.), access control lists (ACL) (e.g., advanced vs. intermediate, etc.), administrator accounts, or the like, or any combination thereof.

As also illustrated, example electronically connected environment 100 may comprise, for example, global view entity 160, which, in some instances, may be implemented via a function and/or process residing on a suitable computing platform and/or device, such as a tablet PC, command kiosk, smart telephone, server device, etc., just to illustrate a few possible implementations. Global view entity 160 may typically, although not necessarily, be applicable and/or implemented with respect to a particular environmental domain, such as a particular organizational or business (e.g., corporation, brand, etc.) entity, for example, rather than a particular retail environment, such as a retail store, though claimed subject matter is not so limited. Global view entity 160 may, for example, allow a particular corporate or like organization (e.g., AT&T® Corporation, etc.) to view real-time and/or historical data, such as via a push and/or pull signal transfer or notifications with respect to operational, statistical, security, or like attributes for a particular retail environment, such as retail store, and/or a number of retail environments, such as a plurality of retail stores (e.g., AT&T® Authorized Dealer stores, etc.). As a way of illustration, depending on an access control level, such as discussed above, global view entity 160 may provide a real-time view, such as via a dashboard or other graphically intuitive design and/or layout, for example, allowing for global inquiry into one or more retail stores of interest. As such, a particular organization may, for example, utilize global view entity 160, in whole or in part, to determine whether applicable products are merchandized according to a prescribed POG, whether a store is operational (e.g., wireless nodes, devices, etc. are powered, secured, etc.), etc., analyze customer interactions within a store (e.g., via device lifts, durations, etc.), employee and/or management activity within a store (e.g., access logs, etc.), or the like.

In some instances, global view entity 160 may provide historical data, such as, again, depending on an access control level, for example, with respect to device interaction and/or customer behavior (e.g., which devices are getting more attention, etc.), access-related activities (e.g., locking, unlocking, arming, disarming, etc.), etc. with respect to a particular a store or any combination thereof. At times, global view entity 160 may, for example, be capable of generating suitable metrics and/or analytics, like which stores are routinely out of POG compliance, which stores are most and/or least popular, which stores are experiencing the most thefts and/or alarms, or the like. In some instances, global view entity 160 may, for example, generate and/or provide customizable reports with respect to any suitable aspect of store-related activity (e.g., number of device lifts, duration of lifts, alarm events, etc.), repair and/or maintenance-related activity (e.g., a number of service visits, parts ordered, etc.), or the like, such as arranged and/or filtered by date, geography, activity, or the like. Global view entity 160 may, for example, implement these or like tasks, processes, etc. via one or more appropriate communications, such as over communications network 140, as one possible example, via a communication link 166. Of course, these are merely details, and claimed subject matter is not so limited.

Although not shown, it should be noted that environment 100 may comprise one or more server devices, such as to facilitate and/or support one or more operations and/or techniques discussed herein. For example, in certain implementations, one or more computing platforms and/or devices associated with one or more entities may function as server devices or as client devices (e.g., in a client-server configuration and/or network), or may function, for example, as peer devices serving at times as both server and client devices (e.g., in a peer-to-peer configuration and/or network). As a way of illustration, in a client-server configuration, one or more server devices may operate as a hub to implement one or more operations and/or techniques for an electronically connected environment, such as serving one or more applicable client devices, including, for example, a desktop computer, a laptop computer, a tablet PC, a command kiosk, a smart telephone, a personal digital assistant (PDA), or the like.

At times, a suitable computer platform, such as a computing platform associated with database 164, as one possible example, may serve one or more applications and/or services in response to requests from one or more other computing platforms or devices (e.g., associated with global view entity 160, etc.) and, as such, may function or otherwise be characterized herein as a server device. Services may include, for example, performing specific tasks (e.g., web site hosting or presence, graphics editing or publishing, streaming audio or video content, etc.), assigning or resolving network names or addresses (e.g., e-mail servers, domain name servers, etc.), storing or retrieving information or resources (e.g., node-related attributes, etc.), responding to requests or inquiries (e.g., POG compliance reports, store viewing, etc.), or the like. Thus, a server device may include, for example, a processing unit that may be operatively coupled to a system memory or like information repository and/or may host one or more processes and/or applications to support one or more processing tasks for environment 100.

In an implementation, one or more computing platforms within environment 100 may communicate with and/or may solicit or request services and/or electronic content from server devices and, as such, may be characterized as client computing devices. A client device, for example, may comprise a special purpose computing apparatus and/or platform having a memory and a processor capable of executing instructions represented by one or more electrical digital signals. As illustrated in example implementations, users and/or groups of users, such as on-site and/or off-site, for example, may access applicable electronic content and/or may carry out tasks (e.g., view stores for POG compliance, request a spot check for a store, arm and/or disarm nodes, lock and/or unlock cabinets, create reports, etc.) on a variety of client computing devices in coordination with one or more server devices, such as in environment 100, for example.

Client devices may further include a display and a graphical user interface (GUI) to present, for example, visual content with respect to one or more applicable tasks. As used herein, GUI may refer to a program interface that utilizes displayed graphical information to allow a user to access and/or manage a special purpose computing platform by a pointer or like device or other peripheral device or mechanism. A pointer, for example, may refer to a cursor, arrow, or other symbol that may appear on a display and/or may be moved and/or controlled with a pointing device to select and/or populate fields and/or input instructions or commands via a GUI of a special purpose computing platform. A pointing device may refer to any device used to control a cursor and/or arrow to select objects and/or input instructions or commands via a GUI of a special purpose computing platform. Pointing devices may include, for example, a mouse, a trackball, a track pad, a track stick, a keyboard, a stylus, a digitizing tablet, or similar types of devices. Herein, terms such as "click" or "clicking" may refer to a selection process made by any pointing device, such as a mouse, for example, but use of such terms is not intended to be so limited. For example, a selection process may be made via a touch screen. For example, "clicking" may be replaced by "touching." However, these are merely examples of methods of selecting objects and/or inputting information and claimed subject matter is not limited in scope in these respects.

It should be appreciated that there may be no single type of client device with which a user or a group of users may choose to access, manage, view, communicate, etc. electronic content associated with example environment 100. Users may work with various types of devices that may have a variety of resident and/or add-on applications, including a thin client computing device (e.g., a network appliance, etc.), a desktop computing device, a smart telephone (iPhone®, etc.), a tablet PC (iPad®, etc.), a PDA, etc., just to name a few examples. For example, in some instances, a particular environment may utilize a so-called "parent" client device (and/or resident application), such as in the form of a tablet PC to control and/or report on a number of aspects with respect to one or more so-called "child" client devices (and/or resident applications), such as in the form of smart telephones. As was indicated, a "parent" client device may, for example, be utilized, at least in part, by a store or shift manager to control and/or report on all or most aspects of a retail environment, such as a retail store, and a "child" client device may be utilized, at least in part, by a store employee to control and/or report on a subset of activities within the store. Thus, in an implementation, a client device may include a browser or similar-type application that may enable a client device to access and/or display electronic content located on one or more server devices associated with environment 100, such as, for example, directly and/or via communications network 140.

In an example implementation, one or more server devices may provide a host environment that may comprise a special purpose multimedia computing platform, which may include one or more suitable host applications providing a dynamic virtualized platform for users and/or groups of users to conveniently access, view, edit, store, share, publish, organize, communicate, etc. electronic content (e.g., via files, folders, etc.) over a public (e.g., the Internet, etc.) and/or private (e.g., an intranet, etc.) electronic or like communications network. Thus, a suitable application programming interface (API) may, for example, be provided within environment 100 by a special purpose host or server computer and may be used, at least in part, to support a GUI on one or more client devices. At times, this may, for example, facilitate and/or support relatively seamless integration between one or more varying client-based resident programs (e.g., on client devices), if applicable, which may implement and/or improve collaboration between various entities, such as for viewing, editing, storing, sharing, publishing, organizing, etc. electronic content.

In at least one implementation, browser-deployed applications may, for example, facilitate and/or support user interaction with electronic content relatively independently of hardware and/or software capabilities that may be available on client devices, such as via a cloud-type web service, as one possible example, that may be accessible via wireless transceiver 138 and/or communications network 140. Thus, at times, a relatively small software load may be advantageously experienced by a thin client device, such as a tablet PC, smart telephone, etc., for example, while one or more communicatively interoperated server devices may carry a fuller load of multiple applications, tasks, services, information, or the like. Accordingly, such an implementation may, for example, provide users and/or groups of users with an efficient, convenient, easy-to-use, etc. visual experience for creating, viewing, editing, sharing, publishing, organizing, etc. electronic content, may improve communication, collaboration, etc. among multiple users and/or groups of users, or the like. In some instances, electronic content may, for example, be accessed and/or downloaded from a host and/or server device (e.g., under a license, etc.), such as to be stored locally on a client device to facilitate and/or support one or more operations and/or techniques discussed herein. Of course, various client-server and/or peer-to-peer implementations as well as associated applications are possible, and it is not intended to limit claimed subject matter to a particular implementation. For example, as was indicated, at times, one or more appropriate communications within example environment 100 may be implemented, at least in part, via a suitable peer-to-peer-type communication protocol.

Even though a certain number of entities, wireless nodes, devices, etc. are illustrated herein, any number of suitable entities, wireless nodes, devices, etc. may be implemented to facilitate and/or support one or more techniques and/or processes associated with example electronically connected environment 100. For example, at times, communications network 140 may be coupled to one or more other wired and/or wireless communications networks (e.g., WLAN, WPAN, etc.) so as to enhance a coverage area for communications with one or more applicable wireless nodes, devices, entities, etc. In some instances, communications network 140 may facilitate and/or support femtocell-based operative regions of coverage, for example, as was indicated. As was also discussed, at times, example environment 100 may comprise, for example, one or more server devices, stand-alone or otherwise, capable of facilitating and/or supporting one or more associated techniques and/or processes. Although not shown, in some instances, example environment 100 may also comprise, for example, one or more other network devices, such as capable of facilitating and/or supporting one or more operations and/or techniques discussed herein. Again, these are merely example implementations, and claimed subject matter is not limited in this regard.

Thus, in operative use, such as in the context of a consumer electronics environment, such as a consumer electronics store, as one possible example, one or more wireless nodes 102, 104, 106, 108, and/or 110 may comprise and/or be associated with, for example, one or more consumer electronics devices, such as smart telephones, tablet PCs, notebooks, PDAs, or the like. As was indicated, consumer electronics devices may, for example, be offered for sale in a particular retail store, such as part of a countertop or table top display, for example. A display may, for example, have a number of display positions that may correspond to a variety of individual device models that are offered for sale. As was discussed with reference to FIG. 2, in some instances, a consumer electronics device may, for example, be tethered to a display base, display post, etc. (e.g., for antitheft security, etc.) where they can be lifted for examination by a potential purchaser and returned to a resting position on the display base, post, etc. To illustrate, a consumer may lift a particular consumer electronics device that may be part of a device node, such as wireless node 104, for example, such as to inspect, evaluate, compare, etc. a consumer electronics device's screen size, user interface, camera, various features, or the like. As such, a consumer may, for example, have an expectation that a consumer electronics device will be operational.

Thus, a display position may, for example, have suitable circuitry and/or processing resources, such as adequate to make electrical or other suitable connections to a particular consumer electronics device for the purposes of supplying power, providing security, implementing signal transfer, or the like, or any combination thereof, as was also discussed. For example, circuitry and/or processing resources associated with a display position may implement antitheft security, such as to trigger an alarm if an attempt is made to remove, disconnect, etc. a consumer electronics device from a display position. This may, for example, be detected via any suitable techniques, such as via one or more pressure switches at a surface between a consumer electronics device and a display base (e.g., mounting surface 214 of FIG. 2, etc.), security cables having pressure switches on a device's housing, physical disconnection of adaptor cable from a display base, or the like.

Continuing with the above discussion, a device node, such as wireless node 104, for example, may communicate information regarding a customer's interaction with an associated consumer electronics device (e.g., a lift event, a duration of lift, a number of lifts, etc.) via communication link 146 to wireless transceiver 138, in real time or otherwise. For example, at times, a particular event (e.g., a lift, etc.) may be communicated by wireless node 104 upon the event's occurrence, as a separate communication, or, optionally or alternatively, a number of events may be buffered or collected in a suitable manner in an associated storage (e.g., buffer, memory appliance, etc.), if applicable, and may be communicated on a periodic basis, just to illustrate another possible implementation. At times, wireless node 104 may also communicate any other suitable information, such as whether an associated consumer electronics device, node, etc. is operational, secure, powered, etc., who accessed a node and/or device, etc., as also discussed herein, such as in real time or otherwise.

As was also discussed, this or like information may be communicated to wireless transceiver 138 directly, such as via communication link 146, for example, and/or via routing or passing through one or more other wireless nodes (e.g., via communication link 112 to wireless node 102, then via communication link 144 to wireless transceiver 138, etc.). This or like information may be communicated with reference to a digital identity of wireless node 104, which may be determined, at least in part, via node ID 122, for example, or, optionally or alternatively, identification entity 130, as was also indicated. In a particular implementation, a digital identity of wireless node 104 may, for example, be determined via identification entity 130 and related communications (e.g., via communication links 154, 156, 158, etc. In some instances, identification entity 130 may, for example, communicate a digital identity of wireless node 104 to wireless transceiver 138, or any suitable number of wireless transceivers, such as via communication links 132 and/or 134. At times, a digital identity of wireless node 104 may, for example, be communicated to wireless transceiver 138, or any suitable number of wireless transceivers, such as over communications network 140 via communication links 136 and 142. Again, claimed subject matter is not limited to particular communications shown in example environment 100.

In an implementation, having received information from one or more wireless nodes, such as wireless node 104, for this example, wireless transceiver 138 may aggregate such information in a suitable manner. For example, wireless transceiver 138 may organize, process, store, batch, etc. received information in one or more buffers, as one possible example, and may subsequently communicate such information to database 164, such as on a periodic basis (e.g., via one or more batches, etc.). Claimed subject matter is not so limited, of course. For example, in some instances, wireless transceiver 138 may communicate applicable information to database 164 in real time, such as upon receipt from wireless node 104, identification entity 130, communications network 140, etc. Thus, depending on an implementation, information may, for example, be communicated from wireless transceiver 138 to database 164 directly, such as via communication link 172, or, optionally or alternatively, over communications network 140, such as via one or more applicable communication links (e.g., link 142, etc.).

Although not shown, one or more wireless nodes may be capable of communicating information to database 164 directly, such as without the use of wireless transceiver 138, just to illustrate another possible implementation. In some instances, one or more entities associated with example environment 100 may be capable of electronically issuing commands or like instructions to one or more wireless nodes. For example, commands or instructions may include "on/off"-type commands, commands regarding time-based action attributes, such as power down commands to save power during night time operations, service mode commands to allow for node maintenance, installation mode commands for joining a network, etc., activation of service commands, installation mode commands, or the like, or any combination thereof.

According to an implementation, database 164 may, for example, store information in any suitable manner and/or format (e.g., a table, matrix, index, cluster, etc.), as was also discussed. In some instances, stored information may, for example, be accessed and/or utilized, in whole or in part, by one or more entities associated with example environment 100, such as for a variety of purposes. For example, at times, database 164 may be accessed by access control entity 162, such as directly via communication link 174 and/or over communications network 140 and appropriate communication links (e.g., 168, 170, etc.) to implement one or more levels of local and/or global access control, such as discussed above. Access control entity 162 may, for example, implement access control in any suitable manner, such as via one or more appropriate communications with wireless transceiver 138, global view entity 160, wireless nodes 102, 104, 106, 108, and/or 110, etc., or any combination thereof. Access control entity 162 may also associate a particular level of access control (e.g., via an ACL, etc.) for a user or group of users with a particular retail environment, such as a particular retail display, store, etc. or a number of displays, stores, etc. and may communicate such information for storing in database 164, such as via communication link 174 and/or 168 and 170. Such information may, for example, be used, at least in part, to audit store personnel access activity, such as via a comparison with applicable access logs.

Figure 3:
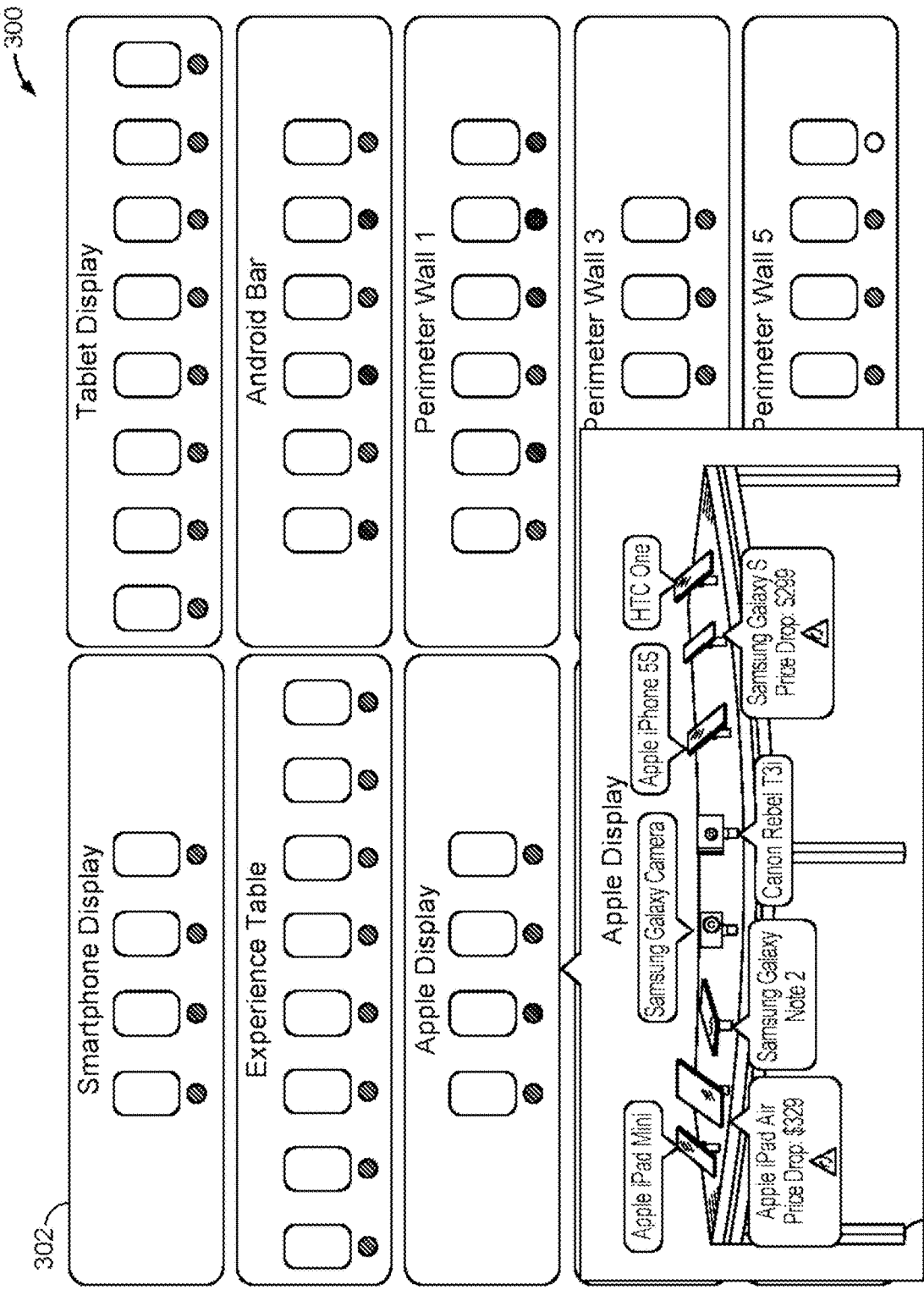
FIG. 3 is an implementation of an example representation of a user interface.

In some instances, database 164 may be accessed by global view entity 160, such as from an off-site location over communications network 140 and associated communication links 166 and 170, for example, to view real-time and/or historical information with respect to operational, statistical, security, or like attributes for a particular retail environment, such as retail store, and/or a number of retail environments, such as a plurality of retail stores, as was also discussed above. For example, as illustrated in FIG. 3, in an implementation, a global view entity (e.g., global view entity 160 of FIG. 1, etc.) may provide, such as via an appropriate user interface 300, a real-time view of a particular consumer electronics retail environment, which may be implemented in connection with a prescribed POG 302, one or more images of associated displays, or the like. By way of example but not limitation, a particular rectangular box in FIG. 3 may represent, for example, a different retail display, such as separated according to brand, product type, or for other suitable (e.g., marketing, etc.) reasons. An image, referenced herein at 304, may, for example, pertain to a particular retail display (e.g., Apple® products, etc.) and may be brought up on an associated computer screen (e.g., via a GUI, etc.) via a user's clicking on or touching a corresponding retail display and/or display position within POG 302, just to illustrate one possible implementation. As such, a particular organization may, for example, utilize a global view entity, in whole or in part, to determine whether applicable products are merchandized according to a prescribed POG, whether a store is operational (e.g., wireless nodes, devices, etc. are powered, secured, etc. via green or red indicators, etc.), or the like. Claimed subject matter is not limited to a particular POG, retail display, layout, etc. illustrated in FIG. 3, of course.

Figure 4:
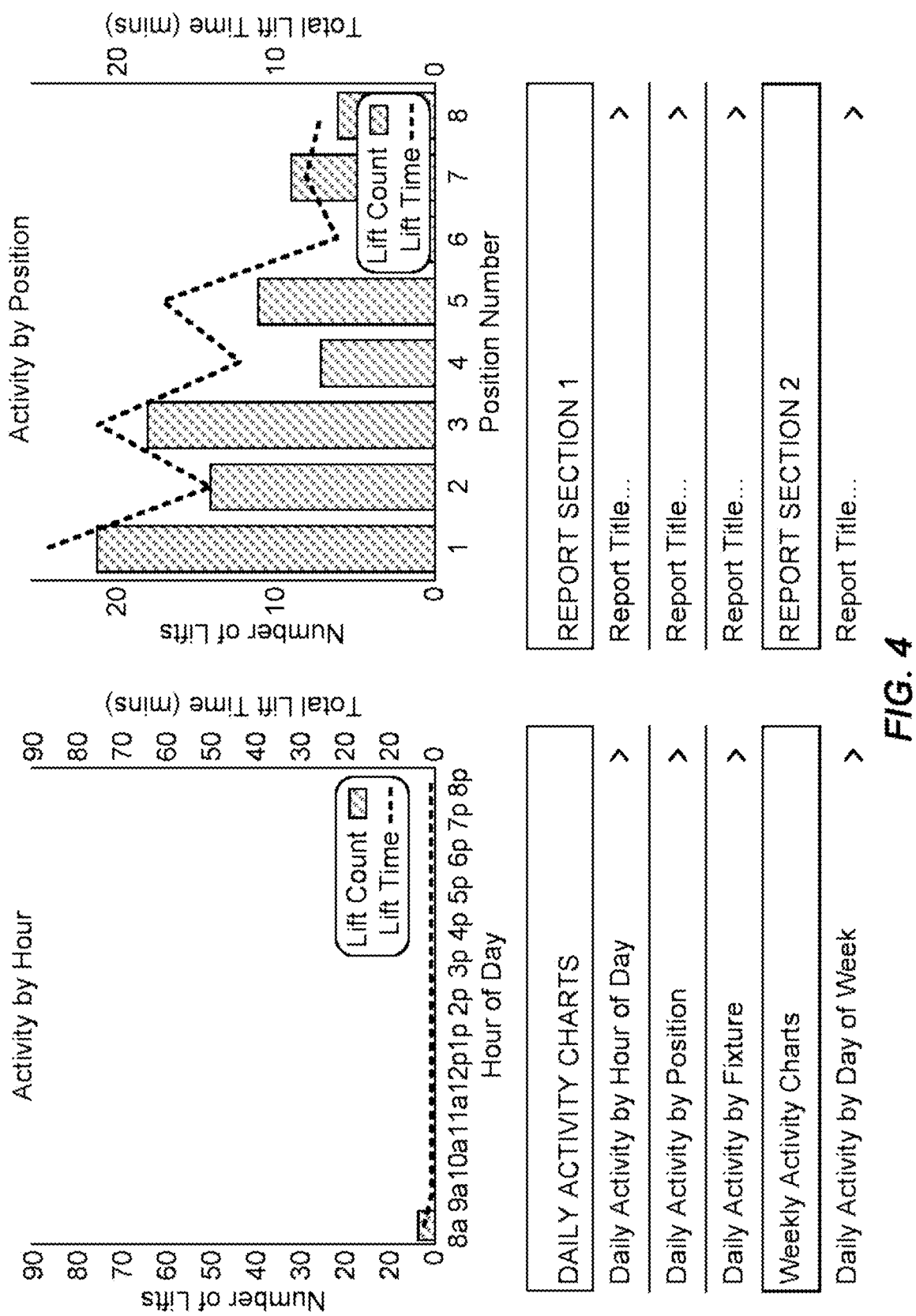
FIG. 4 illustrates implementations of example graphs for customizable reports.

Referring back to FIG. 1, as was also discussed, at times, global view entity 160 may provide historical information, such as, for example, with respect to device interaction and/or customer behavior (e.g., which devices are getting more attention, etc.), access-related activities (e.g., locking, unlocking, arming, disarming, etc.), etc. with respect to a particular a store or any combination thereof. In some instances, global view entity 160 may, for example, be capable of generating suitable metrics and/or analytics, like which stores are routinely out of POG compliance, which stores are most and/or least popular, which stores are experiencing the most thefts and/or alarms, or the like. For example, as illustrated via graphs in FIG. 4 in accordance with a particular implementation, global view entity 160 may, for example, generate and/or provide customizable reports with respect to any suitable aspect of store-related activity (e.g., number of device lifts, duration of lifts, etc.), or the like, such as arranged by hour of day, position, fixture (e.g., countertop display, etc.), or the like. Again, details shown in FIG. 4 are merely examples to which claimed subject matter is not limited.

Figure 5:
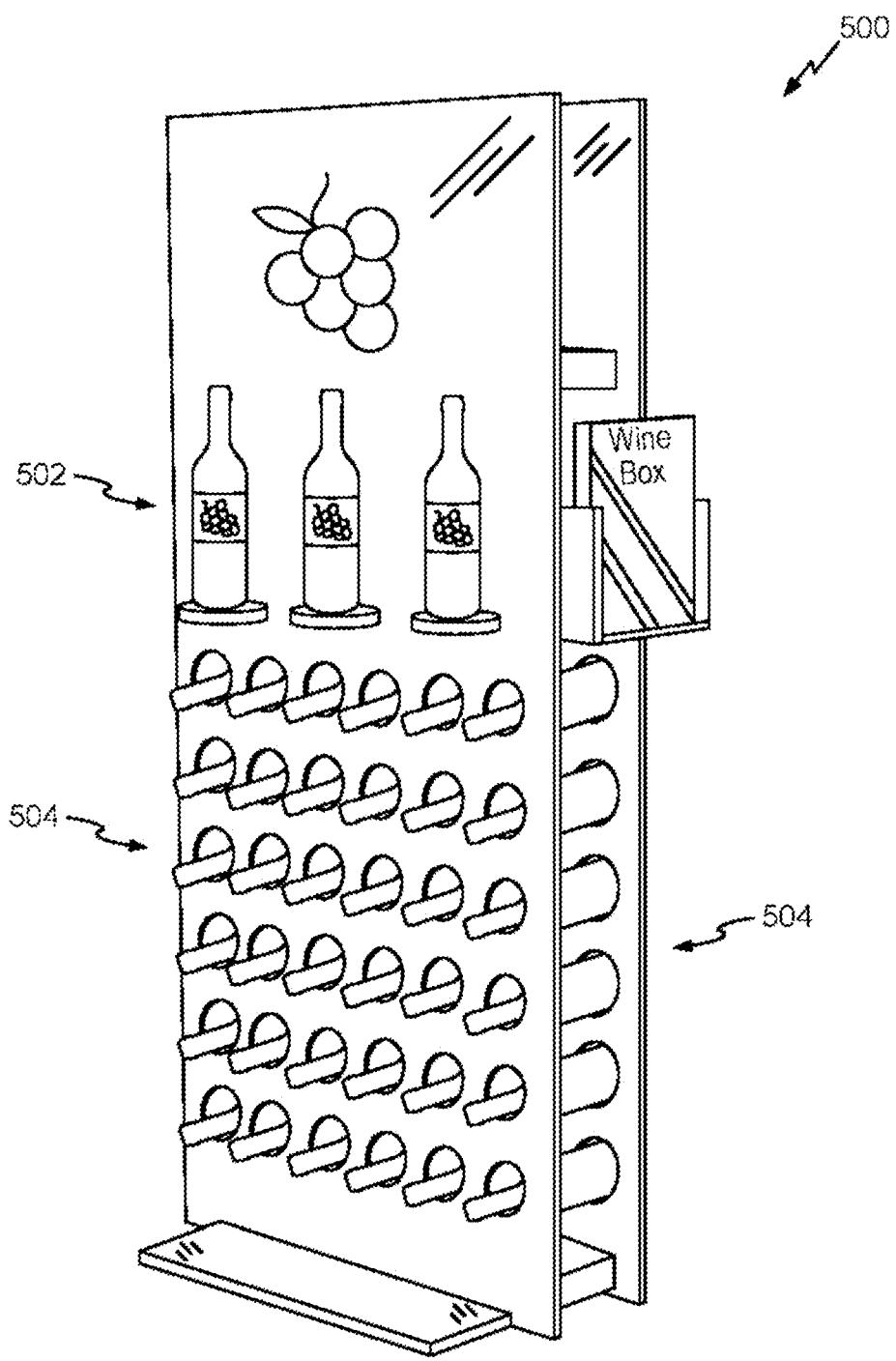
FIG. 5 illustrates example non-nodes viewable via a camera node.

As illustrated in FIG. 5, in an implementation, a global view entity may, for example, provide a viewing capability, such as to monitor, in real time or otherwise, one or more specific physical spaces, areas, etc. that may be occupied by products that may not be a "node." As seen, here, a camera node associated with an electronically connected environment may, for example, image a wine rack 500, such as to confirm that one or more particular products that are not "nodes," such as wine bottles, as one possible example, are displayed at a prescribed physical spot within rack 500, as referenced generally via an arrow at 502. In some instances, a camera node associated with an electronically connected environment may, for example, also be used to confirm that one or more particular wine bottles are appropriately restocked, as referenced generally via an arrow at 504. As such, a particular organization may, for example, be capable of ensuring that a product is being displayed, merchandized, stocked, etc. correctly, as was also discussed. Likewise, FIG. 5 is provided as merely an example to which claimed subject matter is not limited.

By way of another example, such as implemented in the context of an assisted living and/or health care environment employing a number of lock nodes, for example, in operative use, a particular care provider may, for example, be capable of implementing (e.g., controlling, recording, etc.) access to medicines or other protected or suitable items or substances, such as in connection with logging times, names, medicines, dates, etc. of accessing. As was indicated, here, lock nodes may, for example, be used, at least in part, to interoperate a number of aspects, such as regulatory compliance, treatment plans, prescription or like access control, progress reporting, and/or security, or the like within an assisted living and/or health care environment. At times, lock nodes may also be used, at least in part, to address a variety of other aspects, such as to ensure that items are not being stolen and/or used without express permissions, in order to obtain and/or maintain certification status, assess and/or report on staff training and/or delegation, treatment and/or service plans, medication access and/or administration processes, or the like.

By way of example but not limitation, lock nodes may be employed, at least in part, to address theft and/or misuse of medicines, or any other controlled and/or valuable substances, items, etc. in the context of an assisted living and/or health care environment. Namely, in some instances, lock nodes may, for example, provide access control to a number of storage points, such as medicine chests, medical carts, locking cabinets containing sensitive goods and/or information, as well as multiple other uses. These nodes may, for example, be capable of locking and/or unlocking associated locking devices remotely, such as via a suitable network by activation of the locking devices by an authorized user on the network. As such, unauthorized users may not be able to unlock a lock and, thus, access a good. To facilitate and/or support this, one or more access logs may, for example, be implemented, such as via recording accessing events with reference to time, date, name, location, etc. and/or storing the logs in a suitable database. As a way of illustration, access logs may, for example, be used, at least in part, to determine the last user to access a lock before a theft occurred, notify a user if access to an area has been left open for a longer than authorized time period, if a locking device and/or node has malfunctioned, in need of maintenance, or the like, or any combination thereof.

In addition, at times, access logs, such as in connection with a suitable database, for example, may allow for real time or near real time access control of an applicable environment (e.g., adding, removing, etc. users' ability to access locks globally and/or locally via a network, etc.). As was also indicated, in some instances, lock nodes may, for example, facilitate and/or support reporting for regulatory or other compliance aspects, tracking a number of times particular cabinets were opened so as to resupply, electronically refill, restock, etc. applicable medicines, track refills and/or shelf presence so as to determine medicines' expiration dates, or the like, or any combination thereof. Of course, these are merely examples relating to application of lock nodes within a particular environment, and claimed subject matter is not so limited. For example, at times, lock nodes may be used, at least in part, to facilitate and/or support these or like aspects within any other suitable environment (e.g., commercial, industrial, etc.), such as to protect valuable, sensitive, or other suitable materials, information, etc. or any combination thereof. Lock nodes may, for example, be employed, in whole or in part, in connection with accessing vehicles on a dealer's lot, cabinets within a retail store, or the like.

Figure 6:
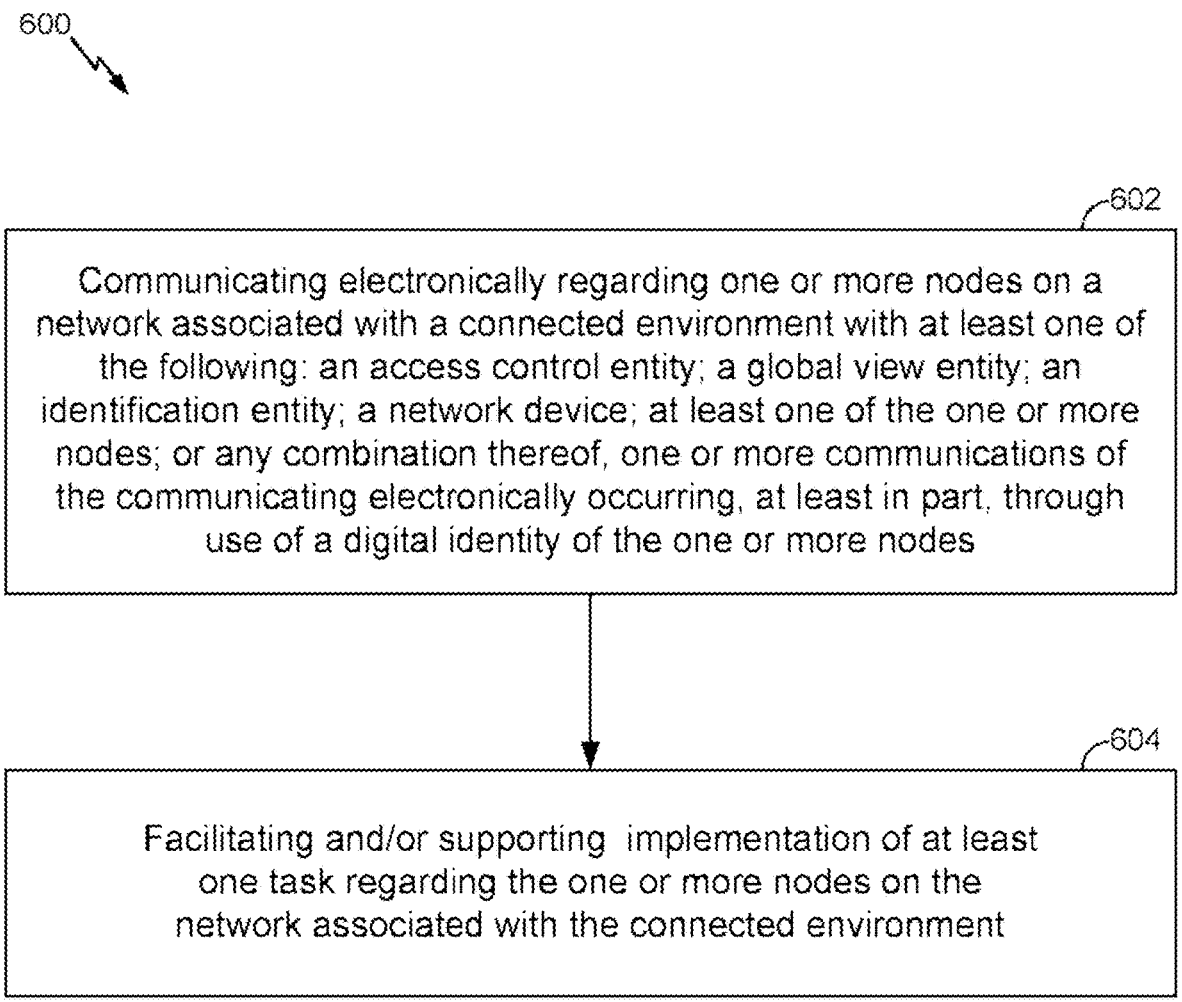
FIG. 6 is a flow diagram illustrating an implementation of an example process for an electronically connected environment.

FIG. 6 is a flow diagram illustrating an implementation of an example process 600 that may be performed, in whole or in part, to facilitate and/or support one or more operations and/or techniques for an electronically connected environment. As was indicated, at times, example process 600 may be implemented, at least in part, in connection with one or more computing and/or communication networks, devices, and/or protocols. It should be noted that information or content acquired and/or produced, such as, for example, input signals, output signals, operations, results, etc. associated with example process 600 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example process 600 may, for example, begin at operation 602 with communicating electronically regarding one or more nodes on a network associated with a connected environment with at least one of the following: an access control entity; a global view entity; an identification entity; a network device; at least one of the one or more nodes; or any combination thereof, one or more communications of the communicating electronically occurring, at least in part, through use of a digital identity of the one or more nodes.

Depending on an implementation, a node may comprise, for example, a device node, a hook node, a shelf node, a display node, a power outlet node, an audio-video (AV) controller node, a camera node, a sensor node, a status indicator node, a docking station node, a goods node, a security node, etc. In some instances, one or more nodes may comprise, for example, one or more wireless nodes capable of communicating electronically, such as via transmitting and/or receiving applicable signals (e.g., via a peer-to-peer, client-server, etc. communication). A connected environment may comprise, for example, a retail environment (e.g., a retail store, retail display, etc.), an assisted living environment, a health care environment, etc., or any combination thereof, which may also depend on a particular implementation. As was indicated, a network may comprise, for example, any suitable wireless and/or wired communications network, or any combination thereof.

As was also discussed, communicating electronically may include one or more communications regarding, for example, status of one or more nodes, a location of one or more nodes, an instruction to one or more nodes, etc., or any combination thereof. For example, communications regarding status of one or more nodes may include communications regarding security-related status (e.g., whether one or more nodes are alarming, secure, etc.), operation-related status (e.g., whether one or more nodes are functioning properly, etc.), access-related status (e.g., who, when, why, etc. accessed one or more nodes, etc.), activity-related status (e.g., lift events, durations, etc.), etc., or any combination thereof. In an implementation, status of one or more nodes may, for example, determined, at least in part, with respect to one or more levels, which may include an employee-type level, a manager-type level, an administrator-type level, a master-administrator-type level, etc., or any combination thereof, such as discussed above. At times, an instruction to one or more nodes may comprise, for example, a command, such as communicated electronically to transition into a maintenance state, installation, learning, etc. state, power down into a power preservation state, or the like, or any combination thereof.

At times, one or more electronic communications regarding one or more nodes may include, for example, communications with a suitable database, which may process, collect, organize, store, etc. associated information using any suitable techniques. A database may comprise, for example, any suitable information repository capable of storing or otherwise retaining any suitable information, which may include statistical attributes, identifying attributes, security attributes, operational attributes, or the like, or any combination thereof, such as related to one or more nodes.

Example process 600 may, for example, continue at operation 604 with facilitating and/or supporting implementation of at least one task regarding the one or more nodes on the network associated with the connected environment. For example, as was also discussed, a task may comprise an access control-related task (e.g., global, local, etc.), an identification-related task (e.g., via a dedicated node ID, separate entity, etc.), a global view-related task (e.g., reporting on POG compliance, customer interactions, employee and/or management activity, etc.), or any other suitable task, such as a master administrator level-related task (e.g., set up and/or deactivate a customer account, generate reports for data monetization, etc.), etc., or any combination thereof.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, 4th, or 5th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 7:
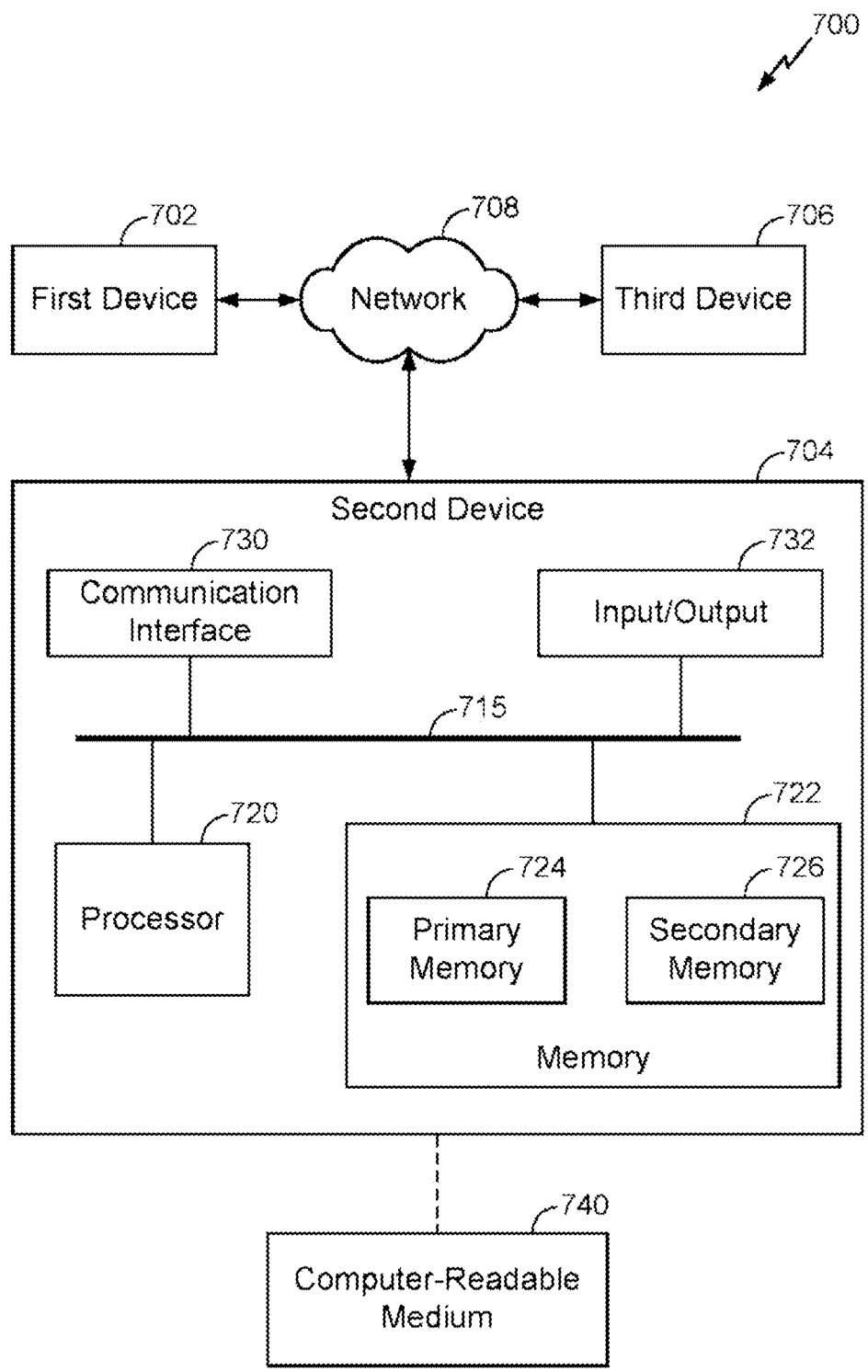
FIG. 7 is a schematic diagram illustrating an implementation of an example computing environment.

In one example embodiment, as shown in FIG. 7, a system embodiment may comprise a local network (e.g., a second device 704 and a computer-readable medium 740) and/or another type of network, such as a computing and/or communications network. For purposes of illustration, therefore, FIG. 7 shows an embodiment 700 of a system that may be employed to implement either type or both types of networks, such as in connection with one or more operations and/or techniques for an electronically connected environment. Network 708 may comprise one or more network connections, links, processes, services, applications, and/or resources to facilitate and/or support communications, such as an exchange of communication signals, for example, between a computing device, such as 702, and another computing device, such as 706, which may, for example, comprise one or more client computing devices and/or one or more server computing device. By way of example, but not limitation, network 708 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 7 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112(f) so that it is specifically intended that 35 § USC 112(f) not be implicated by use of the term "computing device" and/or similar terms; however, if it is determined, for some reason not immediately apparent, that the foregoing understanding cannot stand and that 35 § USC 112(f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1, 2, and/or 7 and paragraphs [0018]-[0070], [0111]-[0124] of the present disclosure.

As further illustrated in FIG. 7, in an embodiment, first and third devices 702 and 706 may be capable of rendering a graphical user interface (GUI) for a network device and/or a computing device, for example, so that a user-operator may engage in system use. Device 704 may potentially serve a similar function in this illustration. Likewise, in FIG. 7, computing device 702 ('first device' in figure) may interface with computing device 704 ('second device' in figure), which may, for example, also comprise features of a client computing device and/or a server computing device, in an embodiment. Processor (e.g., processing device) 720 and memory 722, which may comprise primary memory 724 and secondary memory 726, may communicate by way of a communication bus 715, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 704, as depicted in FIG. 7, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (Wi-MAX). A computing device and/or a networking device may also have a subscriber identity module (SIM) card, which, for example, may comprise a detachable or embedded smart card that is able to store subscription content of a user, and/or is also able to store a contact list. As also discussed, a computing device and/or a networking device may also have other identities. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 7, computing device 702 may provide one or more sources of executable computer instructions in the form physical states and/or signals (e.g., stored in memory states), for example. Computing device 702 may communicate with computing device 704 by way of a network connection, such as via network 708, for example. As previously mentioned, a connection, while physical, may not necessarily be tangible. Although computing device 704 of FIG. 7 shows various tangible, physical components, claimed subject matter is not limited to computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 722 may comprise any non-transitory storage mechanism. Memory 722 may comprise, for example, primary memory 724 and secondary memory 726, additional memory circuits, mechanisms, or combinations thereof may be used. Memory 722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 722 may be utilized to store a program of executable computer instructions. For example, processor 720 may fetch executable instructions from memory and proceed to execute the fetched instructions. Memory 722 may also comprise a memory controller for accessing device readable-medium 740 that may carry and/or make accessible digital content, which may include code, and/or instructions, for example, executable by processor 720 and/or some other device, such as a controller, as one example, capable of executing computer instructions, for example. Under direction of processor 720, a non-transitory memory, such as memory cells storing physical states (e.g., memory states), comprising, for example, a program of executable computer instructions, may be executed by processor 720 and able to generate signals to be communicated via a network, for example, as previously described.

Memory 722 may store electronic files and/or electronic documents, such as relating to one or more users, and may also comprise a device-readable medium that may carry and/or make accessible content, including code and/or instructions, for example, executable by processor 720 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Continuing with FIG. 7, processor 720 may comprise one or more circuits, such as digital circuits, to perform at least a portion of a computing procedure and/or process. By way of example, but not limitation, processor 720 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 720 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates device 704 as including a component 732 operable with input/output devices, for example, so that signals and/or states may be appropriately communicated between devices, such as device 704 and an input device and/or device 704 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A system comprising:
  a plurality of nodes that are connectable to a network, the network including a wireless network, each node having a digital identity that identifies the node within the network, and wherein the nodes comprise:
    a plurality of post positions, each post position for displaying a product at a physical slotting position in a product display area, wherein each post position is configured to (1) receive a product identifier for the displayed product and (2) communicate post position data for dissemination via the network, wherein the communicated post position data links the product identifier for the displayed product with the digital identity for the post position;
    a plurality of locks, wherein each lock is configured to (1) communicate lock status data for dissemination via the network, wherein the communicated lock status data links a plurality of lock statuses with a plurality of digital identities for the locks corresponding to the lock statuses;
    an aggregator that includes a wireless interface, wherein the aggregator is configured to collect the communicated post position data from the post positions and the communicated lock status data from the locks via the network; and a computer system;

wherein the aggregator is further configured to wirelessly communicate the collected post position data and the collected lock status data to the computer system via the wireless interface and the wireless network;

wherein the computer system is configured to generate first view data from (1) the collected post position data and (2) data that links the post position digital identities to their physical slotting positions such that the first view data tracks which products are located at which physical slotting positions via linkages among the product identifiers, post position digital identities, and physical slotting positions within the first view data; and wherein the computer system is further configured to generate second view data from the collected lock status data such that the second view data tracks lock statuses for a plurality of the locks.

2. The system of claim 1, wherein the communicated post position data from the post positions further comprises lift statistics data regarding customer interactions with the corresponding post positions; and wherein the computer system is further configured to include the lift statistics data in the first view data such that the first view data associates the customer interactions with the physical slotting positions that are linked to the post position digital identities.

3. The system of claim 2, wherein the computer system is further configured to provide reports to users regarding the lift statistics data.

4. The system of claim 3, wherein each of a plurality of the post positions comprises a liftable mounting puck for displaying a product;

wherein the lift statistics data includes data regarding customer lifts of the mounting pucks; and wherein the lift statistics data associates customer lifts of the mounting pucks with the physical slotting positions that are linked to the post position digital identities corresponding to the post positions for which customers lifted the mounting pucks.

5. The system of claim 4, wherein the lift statistics data further includes data that identifies the products displayed on the lifted mounting pucks.

6. The system of claim 5, wherein the reports show a breakdown of lift statistics by the physical slotting positions for the post positions.

7. The system of claim 5, wherein the lift statistics data further includes data that identifies times of day for the customer lifts of the mounting pucks.

8. The system of claim 7, wherein the reports show a breakdown of lift statistics by time of day.

9. The system of claim 5, wherein the lift statistics data further includes data that identifies a duration for the customer lifts of the mounting pucks.

10. The system of claim 9, wherein the reports show a breakdown of lift statistics by durations for the customer lifts.

11. The system of claim 3, wherein the computer system is further configured to provide the reports to users via a graphical user interface.

12. The system of claim 1, wherein the computer system comprises a local computer that serves as an access control entity.

13. The system of claim 12, wherein the computer system further comprises a server linked to the local computer via the network, wherein the server serves as a global view entity.

14. The system of claim 1, wherein each of a plurality of the post positions comprises a liftable mounting puck for displaying a product.

15. The system of claim 14, wherein the post positions are arranged to serve as wireless nodes in the wireless network, the post positions configured to wirelessly communicate the post position data that links the product identifiers for the displayed products with the digital identities for the post positions to the aggregator via the wireless network.

16. The system of claim 15, wherein each of a plurality of the liftable mounting pucks comprises a wireless interface such that the liftable mounting pucks with wireless interfaces are addressable on the wireless network, and wherein the liftable mounting pucks with the wireless interfaces are configured to wirelessly communicate the post position data that links the product identifiers for the displayed products with the digital identities for the post positions to the aggregator via the wireless network and the liftable mounting pucks' wireless interfaces.

17. The system of claim 16, wherein the post position digital identities comprise digital identities for the wirelessly addressable liftable mounting pucks.

18. The system of claim 16, wherein the wireless network comprises a wireless mesh network that wirelessly meshes the wireless interfaces of the liftable mounting pucks.

19. The system of claim 14, wherein the computer system is further configured to provide a view of the first view data for display to a user via a user interface, wherein the view of the first view data relates product identifiers for the displayed products to physical slotting positions in the display area.

20. The system of claim 19, wherein the physical slotting positions comprise position numbers at a display table.

21. The system of claim 1, wherein the product identifier comprises at least one of a model, type, and make for the product.

22. The system of claim 1, wherein the locks comprise electromechanical locks for securing a plurality of merchandise cabinets.

23. The system of claim 1, wherein the locks are arranged to serve as wireless nodes in the wireless network, the locks configured to wirelessly communicate the lock status data to the aggregator via the wireless network.

24. The system of claim 23, wherein the wireless network comprises a wireless mesh network that wirelessly meshes the locks.

25. The system of claim 23, wherein the computer system is configured to wirelessly transmit a lock command to an individual lock within the wireless network based on the digital identity of the individual lock;

wherein the individual lock is configured to (1) receive the transmitted lock command via the wireless network, and (2) lock itself in response to the received lock command.

26. The system of claim 23, wherein the computer system is configured to wirelessly transmit an unlock command to an individual lock within the wireless network based on the digital identity of the individual lock;

wherein the individual lock is configured to (1) receive the transmitted unlock command via the wireless network, and (2) unlock itself in response to the received unlock command.

27. The system of claim 26, wherein the computer system is configured to generate the unlock command in response to a user input.

* * * * *